United States Patent
Tomaru et al.

[11] Patent Number: 6,024,645
[45] Date of Patent: Feb. 15, 2000

[54] DOUBLE CARDAN TYPE CONSTANT VELOCITY JOINT

[75] Inventors: Masaki Tomaru, Shibukawa; Sakae Matsumoto, Takasaki, both of Japan

[73] Assignee: NSK Ltd., Tokyo, Japan

[21] Appl. No.: 09/038,150

[22] Filed: Mar. 11, 1998

Related U.S. Application Data

[63] Continuation-in-part of application No. 08/824,186, Mar. 26, 1997.

[30] Foreign Application Priority Data

| Apr. 5, 1996 | [JP] | Japan | 8-084103 |
| Jul. 31, 1996 | [JP] | Japan | 8-202432 |
| Aug. 21, 1996 | [JP] | Japan | 8-219676 |
| Jun. 25, 1997 | [JP] | Japan | 9-168884 |
| Jun. 27, 1997 | [JP] | Japan | 9-171503 |

[51] Int. Cl.$^7$ .................................................. F16D 3/30
[52] U.S. Cl. ........................................... 464/118; 464/905
[58] Field of Search ................................... 464/112, 114, 464/117, 118, 905

[56] References Cited

U.S. PATENT DOCUMENTS

| 3,470,712 | 10/1969 | Geisthoff et al. | 464/118 |
| 4,257,243 | 3/1981 | Herchenbach | 464/905 |
| 4,436,515 | 3/1984 | Mallet | 464/114 |
| 4,490,125 | 12/1984 | Konrad et al. | 464/905 |
| 4,781,662 | 11/1988 | Mayhew et al. | 464/118 |
| 4,799,817 | 1/1989 | Geisthoff | 464/139 |
| 4,997,407 | 3/1991 | Kretschmer et al. | 464/118 |

*Primary Examiner*—Eileen Dunn Lillis
*Attorney, Agent, or Firm*—Vorys, Sater, Seymour and Pease LLP

[57] ABSTRACT

A double Cardan type constant velocity joint has a crank type angle adjusting member rotatably supported in a central portion of a support plate that is provided inwardly of an intermediate housing. First and second engagement protrusions provided at front end portions of first and second yokes engage in an oscillatable manner with first and second engagement holes formed in the angle adjusting member. The angle adjusting member does not displace in a diametrical direction even when rotated.

11 Claims, 22 Drawing Sheets

DOUBLE CARDAN TYPE CONSTANT VELOCITY JOINT

CROSS-REFERENCE TO RELATED APPLICATION

This application is a continuation-in-part of application Ser. No. 08/824,186 filed Mar. 26, 1997.

BACKGROUND OF THE INVENTION

1. Field of the Invention

The present invention relates to a double Cardan type constant velocity joint incorporated into, e.g., a steering apparatus of an automobile and utilized for transmitting a rotating force acting on a steering wheel to a gear box.

2. Related Background Art

The steering apparatus of the automobile transmits a motion of the steering wheel to the gear box via a steering shaft, a universal joint and an intermediate shaft, and gives a desired steering angle to front wheels. In the case of a typical steering apparatus, an angle of intersection (joint angle) between the steering shaft and the intermediate shaft is not large, and hence a typical Cardan joint (cruciform universal joint) is employed as an universal joint for connecting these two shafts. As known well, the typical Cardan joint has a nonuniform velocity in terms of transmitting a rotating force in a state where the joint angle is given. The nonuniform velocity to such an extent is not, however, a problem in terms of utility as far as the joint angle is comparatively small. Further, it is also practiced that two pieces of Cardan joints are used to offset the nonuniform velocity. In recent years, however, it happened that the angle of intersection between the steering shaft and the intermediate shaft increases in order to ensure an improvement of security against collisions in some of the automobiles such as cab-over type automobiles, etc. In such a case, if the typical Cardan joint is used, the nonuniform velocity for transmitting the rotating force becomes large enough not to be ignorable. Then, in such a case, it can be considered to employ a double Cardan type constant velocity joint.

Double Cardan type constant velocity joints hitherto known are disclosed in, e.g., Japanese Patent Post-Exam Publication No.50-21610 and Japanese Patent Laid-Open Publication No.7-251746. FIGS. 14 and 15 show the double Cardan type constant velocity joint disclosed in Japanese Patent Post-Exam Publication No.50-21610 thereof. This double Cardan type constant velocity joint 101 includes an intermediate housing 102, first and second yokes 103, 104, a first cross shaft 105 for connecting the first yoke 103 to the intermediate housing 102, and a second cross shaft 106 for connecting the second yoke 104 to the intermediate housing 102.

The intermediate housing 102 among those components has a pair of first support arms 107, 107 provided at one end thereof (a right end in FIGS. 28 and 29) in an axial direction and a pair of second support arms 108, 108 provided at the other end thereof (a left end in FIGS. 28 and 29) in the axial direction in equiphase with each other. Then, first support holes 109, 109 concentric to each other are formed in front end portions of the first support arms 107, 107, while second support holes 110, 110 concentric to each other are formed in front end portions of the second support arms 108, 108.

Further, the first yoke 103 includes a pair of third support arms 111, 111 provided at one end (a left end in FIGS. 28 and 29), in the axial direction, of a connecting cylindrical portion 144 to which an end portion of a rotary shaft (unillustrated) such as the steering shaft or the like can be connected and fixed. Then, third support holes 112, 112 concentric to each other are formed respectively in close-to-front-end portions of the third support arms 111, 111. Moreover, a first engagement protrusion 114 protruding opposite to the connecting cylindrical portion 144, is formed on an intermediate portion of a first connecting portion 113 for connecting mutually the front ends of the third support arms 111, 111.

Furthermore, the second yoke 104 includes a pair of fourth support arms 116, 116 provided at one end (a right end in FIGS. 28 and 29), in the axial direction, of a connecting cylindrical portion 115 to which an end portion of another rotary shaft (unillustrated) such as the intermediate shaft or the like can be freely connected and fixed. Then, fourth concentric support holes 117, 117 are formed respectively in close-to-front-end portions of these fourth support arms 116, 116. Moreover, a second engagement protrusion 119 protruding opposite to the connecting cylindrical portion 115, is formed on an intermediate portion of a second connecting portion 118 for connecting mutually the front ends of the fourth support arms 116, 116.

Then, of first and second shaft portions 120, 121 constituting a first cross shaft 105 in a mutually intersecting state, both end portions of the first shaft portion 120 are rotatably supported inwardly of the first support holes 109, 109 respectively through radial needle bearings 122, 122, and both end portions of the second shaft portion 121 are rotatably supported inwardly of the third support holes 112, 112 through the same radial needle bearings 122, 122. On the other hand, of third and fourth shaft portions 123, 124 constituting a second cross shaft 106 in the mutually intersecting state, both end portions of the third shaft portion 123 are rotatably supported inwardly of the second support holes 110, 110 respectively through the radial needle bearings 122, 122, and both end portions of the fourth shaft portion 124 are rotatably supported inwardly of the fourth support holes 117, 117 respectively through the radial needle bearings 122, 122.

Further, the intermediate housing 102 is constructed by connecting a first intermediate housing element 125 including the first support arms 107, 107 to a second intermediate housing element 126 including the second support arms 108, 108 with a plurality of bolts 127, 127. An angle adjusting member 129 is so provided as to be displaceable in a plane orthogonal to the central axis of the intermediate housing 102, within a slide space 128 formed between the first and second intermediate housing elements 125, 126, which space is defined as an axis-directional intermediate portion of the above intermediate housing 102.

First and second engagement holes 130, 131 are formed in equiphase (concentrically) in both end portions, in the axial direction, of the angle adjusting member 129. Then, the first engagement protrusion 114 engages with the first engagement hole 130 in a freely oscillatable displaceable manner, while the second engagement protrusion 119 likewise engages with the second engagement hole 131. Based on the engagements of the first and second engagement protrusions 114, 119 with the first and second engagement holes 130, 131, angles of inclination of the first and second yokes 103, 104 to the intermediate housing 102 are made coincident with each other.

In the case of the thus constructed double Cardan type constant velocity joint 101, when the first yoke 103 is rotated, a force of this rotation is transmitted to the second yoke 104 via the first cross shaft 105, the intermediate housing 102 and the second cross shaft 106. A positional relationship between the first and second yokes 103, 104 and the intermediate housing 102 changes based on the transmission of this rotating force. This change is, however, absorbed by the angle adjusting member 125 oscillating in the plane orthogonal to the central axis of the intermediate housing 102 within the slide space 128 formed inwardly of the intermediate housing 102.

In the case of the prior art structure using a sliding plate as an angle adjusting member, it is required that a diameter of the intermediate housing be increased corresponding to a displacement of the sliding plate in the diametrical direction of the intermediate housing. Therefore, a diameter of a space (swing circle) for the double Cardan type constant velocity joint swinging when transmitting the rotating force, increases enough to require a larger installing space.

Further, an area of friction between the sliding plate and the intermediate housing is large, and a force needed for displacing the sliding plate augments. Hence, a loss of force when transmitting the rotating force becomes large.

Moreover, foreign matters such as dusts or the like are easy to permeate the frictional surface between the sliding plate and the intermediate housing. If the foreign matters permeate the frictional surface, there must be a progression of abrasion of the frictional surface, resulting in such a problem that the durability declines.

The prior art double Cardan type constant velocity joint 101 described above is constructed such that first and second intermediate housing elements 125, 126 constituting the intermediate housing 102 are manufactured by effecting forge-working or cutting on the metal material. Therefore, this might lead to an increase in costs for the materials and working of the intermediate housing 102 constructed of these first and second intermediate housing elements 125, 126. Consequently, there must be an increased price of the double Cardan type constant velocity joint 101 incorporating the intermediate housing 102.

SUMMARY OF THE INVENTION

A double Cardan type constant velocity joint according to the present invention was invented under such circumstances.

It is a primary object of the present invention to provide a double Cardan type constant velocity joint that has the smaller installing space, the smaller loss of transmitting force, the better durability, and can be manufactured at low costs.

To this end, according to one aspect of the present invention, as in the same way with the above-described prior art double Cardan type constant velocity joint, a double Cardan type constant velocity joint according to the present invention comprises an intermediate housing, first and second yokes, a first cross shaft for connecting the first yoke to the intermediate housing, and a second cross shaft for connecting the second yoke to the intermediate housing.

Among these components, the intermediate housing has a pair of first support arms provided at one end thereof in an axial direction, and a pair of second support arms provided at the other end thereof in the axial direction in equiphase with each other. Then, first support holes concentric to each other are formed in front end portions of the first support arms, and second support holes concentric to each other are formed in front end portions of the second support arms, respectively.

Also, the first yoke has a pair of third support arms provided at axis-directional one end of a first connecting cylindrical portion to which an end portion of a rotary shaft can be connected and fixed. The first yoke includes third support holes concentric to each other, which are formed in close-to-front-end portions of the third support arms, and a first engagement protrusion so formed on an intermediate portion of a first connecting portion for connecting the front ends of the third support arms as to protrude opposite to the first connecting cylindrical portion.

Further, the second yoke has a pair of fourth support arms provided at axis-directional one end of a second connecting cylindrical portion to which an end portion of another rotary shaft can be freely connected and fixed. The second yoke also has fourth support holes concentric to each other, which are formed in close-to-front-end portions of the fourth support arms, and a second engagement protrusion so formed on an intermediate portion of a second connecting portion for connecting the front ends of the fourth support arms as to protrude opposite to the second connecting cylindrical portion.

Then, both end portions of a first shaft portion of first and second shaft portions constituting the first cross shaft in a mutually intersecting state, are rotatably supported inwardly of the first support hole, and both end portions of the second shaft portion are rotatably supported inwardly of the third support hole. Also, both end portions of a third shaft portion of third and fourth shaft portions constituting the second cross shaft in a mutually intersecting state, are rotatably supported inwardly of the second support hole, and both end portions of the fourth shaft portion are rotatably supported inwardly of the fourth support hole.

Moreover, an axis-directional intermediate portion of the intermediate housing is provided with an angle adjusting member displaceable with respect to the intermediate housing. Then, both end portions, in the axial direction, of the angle adjusting member are formed with first and second engagement holes in equiphase with each other. Further, angles of inclination of the first and second yokes to the intermediate housing are set coincident with each other by engaging the first engagement protrusion with the first engagement hole and the second engagement protrusion with the second engagement hole in a freely oscillatable displaceable manner.

In particular, the double Cardan type constant velocity joint according to the present invention comprises a support plate provided an axis-directional intermediate portion of the intermediate housing, a circular hole formed in a central portion of the support plate, and a crank type angle adjusting member with its intermediate portion rotatably supported inwardly of the circular hole.

This angle adjusting member includes a cylindrical intermediate portion, and first and second crank portions bent in the same direction as a diametrical direction of the intermediate portion from both end surfaces, in the axial direction, of the intermediate portion. The first engagement hole is formed in a front end portion of the first crank portion. The second engagement hole is formed in a front end portion of the second crank portion.

Note that when embodying the double Cardan type constant velocity joint according to the present invention, one through a plurality of items among the following items (1)–(4) may be added other than the construction given above as the necessity arises.

(1) a minor diameter of the circular hole formed in the support plate is set well larger than a major diameter of the intermediate portion of the angle adjusting member, and this intermediate portion is set displaceable in the radial directions inwardly of the circular hole.

(2) Increased is an area of a portion sliding on a part of the support plate, which portion is a part of the angle adjusting member.

(3) For actualizing the above item (2), collar portions between which both surface of the support plate are sandwiched in, are formed at both end portions, in the axial direction, of a cylindrical intermediate portion constituting the angle adjusting member. Then, a major diameter of this collar portion is set well lager than the minor diameter of the circular hole formed in the support plate.

(4) A dimension, in the radial direction, of a minor diameter side gap existing between an outer peripheral surface of the intermediate portion and an inner peripheral surface of the circular hole, is equalized to a dimension, in the radial direction, of a major diameter side gap existing between a outer peripheral edge of the collar portion and a partial inner peripheral surface of the intermediate housing.

Especially in the double Cardan type constant velocity joint according to the present invention, the intermediate housing can be constructed by press-working, preferably, a metal plate, and may also be constructed by connecting a first intermediate housing element including the first support arms to a second intermediate housing element including the second support arms, which second intermediate housing element is constructed by likewise press-working the metal plate.

In the case of the thus constructed double Cardan type constant velocity joint according to the present invention, when the first yoke is rotated, a force of this rotation is transmitted to the second yoke via the first cross shaft, the intermediate housing and the second cross shaft. Based on the transmission of this rotating force, there varies a positional relationship between the first and second yokes and the intermediate housing. This variation is, however, absorbed by the angle adjusting member rotating inside the intermediate housing.

The angle adjusting member rotates about the intermediate portion but does not largely displace in the diametrical direction of the intermediate housing. That is, the angle adjusting member only moves slightly in the diametrical direction for absorbing the error. Accordingly, the diameter of this intermediate housing may be set enough to permit the rotation of the angle adjusting member. Therefore, the installing space can be made narrower by reducing a swing circle of the double Cardan type constant velocity joint with a decreased diameter of the intermediate housing than by using the sliding plate as the angle adjusting member as in the prior art structure.

Furthermore, the rotation of the angle adjusting member resists only a frictional force acting on between the outer peripheral surface of the cylindrical intermediate portion provided at the angle adjusting member, and the inner peripheral surface of the circular hole formed in the support plate of the intermediate housing, and is performed lightly. Accordingly, a loss of force when transmitting the rotating force is small.

Moreover, it is an easy practice that the rotation support portion of the angle adjusting member is not exposed to an external space, and, besides, the installing portions of the first and second cross shafts can be surely spaced away from each other by the support plate for supporting the angle adjusting member. Therefore, it is feasible to easily prevent the foreign matters such as dusts or the like from permeating the rotation support portions of the first and second cross shaft and the angle adjusting member as well. This facilitates an enhancement of durability owing to the prevention of abrasion of each rotation support portion.

Note that in the case of the double Cardan type constant velocity joint according to the present invention, the two first and second engagement protrusions formed at the first and second yokes are displaceable in the circumferential direction of the intermediate housing, and hence the positional relationship in the circumferential direction between the first and second yokes and the intermediate housing, is changeable. Whereas the two first and second engagement protrusions are incapable of displacing in the diametrical direction of the intermediate housing, and therefore an intersecting angle (joint angle) between the first and the second yokes can not be largely adjusted. In the case of the steering apparatus incorporating the double Cardan type constant velocity joint at which the present invention aims, however, the joint angle remains fixed. Hence, the joint angle may be adjusted to such an extent that an error due to the assembly, etc. can be absorbed. Accordingly, it is not a problem in terms of the utility that the joint angle can not be largely adjusted.

In contrast with this, as in the case of the above-described additional requirement (1), when the minor diameter of the circular hole formed in the support plate is set sufficiently larger than the major diameter of the intermediate portion of the angle adjusting member, and if this intermediate portion is freely displaceable in the radial direction inwardly of the circular hole, it is feasible to increase a degree at which to absorb the error (allowable error) attributed to the above assembly or the like.

Further, as in the case of the additional requirements (2) and (3) given above, if the area of the portion sliding on a part of the support plate, which portion is a part of the angle adjusting member, is properly increased by setting the major diameter of each of the collar portions formed at both end portions, in the axial direction, of the intermediate portion, well larger than the minor diameter of the circular hole or by other methods, it is possible to restrain the abrasion of the sliding portion between the angle adjusting member and the support plate. In particular, if the major diameter of the above collar portion is enlarged, it is feasible to reduce the degree at which the angle adjusting member is inclined to the support plate. Backlash of the double Cardan type constant velocity joint due to the tilt of the angle adjusting member can be thereby restrained.

Moreover, as in the additional requirement (4) given above, the dimension, in the radial direction, of the minor diameter side gap existing between the outer peripheral surface of the intermediate portion and the inner peripheral surface of the circular hole, is equalized to the dimension, in the radial direction, of the major diameter side gap existing between the outer peripheral edge of the collar portion and the partial inner peripheral surface of the intermediate housing. With this arrangement, when the angle adjusting member displaces in the radial direction, the outer peripheral surface of the intermediate portion comes in contact with the inner peripheral surface of the circular hole. Simultaneously, the outer peripheral edge of the collar portion is brought into contact with the partial inner peripheral surface of the intermediate housing. As a result, the force for making the angle adjusting member displace in the radial direction can be sustained at a plurality of places. Damages to the angle adjusting member, the support plate against which this angle adjusting member is pushed, and the intermediate housing, can be thereby prevented.

Especially in the double Cardan type constant velocity joint according to the present invention, when the first and second housing elements constituting the intermediate housing are constructed by press-working the metal plate, it is possible to reduce the costs for the materials and working of the intermediate housing constructed of these first and second intermediate housing elements. As a result, the price of the double Cardan type constant velocity joint incorporating the intermediate housing can be decreased.

In the case of the double Cardan type constant velocity joint according to the prior art, since the support plate and the first and second intermediate housing elements are connected and fixed to each other based on threadable engagement and tight fastening between the bolts and nuts, the following problems (1) to (4) are brought about.

(1) Since any of these bolts and nuts is required to be restrained by use of a spanner or other tool when these members are fastened to each other, it is troublesome to connect and fix the support plate to the first and second intermediate housing elements.

(2) Since the nuts are projecting from a base plate which constitutes any of the intermediate housing elements, a space for installing the intermediate housing can be easily increased accordingly. That is, in order to prevent interference between each of the nuts and the support arm for constituting the yoke, a space between the paired bolts is required to be enlarged, which can easily increase the size of the intermediate housing.

(3) Since the nuts are required, the number of the components is increased accordingly, and the weight as well as the costs therefor is also increased.

(4) In order to interlock the tools when the bolts and the nuts are to be fastened, it is necessary to provide at least one pair of flat planes which are parallel to each other for each of these members. However, there is a limit for reduce a space between the flat planes provided on the nuts each having a screw hole in the central portion thereof, unlike in the case of those provided on the bolts. For this reason, the bulk of the nut and a space for inserting the tool to be interlocked with this nut will be enlarged.

Still another object of the present invention is to provide a double Cardan type constant velocity joint which can avoid any of these inconveniences.

According to a double Cardan type constant velocity joint of the present invention to achieve the object stated last, the intermediate housing comprises a support plate for displaceably supporting the angle adjusting member in the central portion thereof, a first intermediate housing element which is formed by press-working a metal plate and includes the first support arm, a second intermediate housing element which is formed by press-working a metal plate and includes the second support arm, and a bolt for connecting and fixing these first and second intermediate housing elements to each other in the state where the support plate is made to be sandwiched in and between the first and second intermediate housing elements. Then, a screw hole for threadably engaging the front end portion of this bolt is directly formed on one or both of the first and second housing elements.

The effects when the rotating force is transmitted to and from the first and second yokes while maintaining the constant velocity by the double Cardan type constant velocity joint of the present invention thus constructed are the same as those of the double Cardan type constant velocity joint described before.

Specially, in the case of the double Cardan type constant velocity joint of the present invention, since the screw hole for threadably engaging the front end portion of the bolt is directly formed on one or both of the first and second intintermediate housing elements, nuts can be omitted. As a result, it is no longer required to suppress the nut when the bolt is fastened, so that the work for connecting and fixing the support plate to the first and second intermediate housing elements can be conducted easily. Also, since no nut is protruding from any of the intermediate housing elements, the space for installing the intermediate housing can be reduced. Also, since the nut is no longer required, the number of the components can be reduced and the costs and weight therefor can be also reduced accordingly. Further, it will suffice if the flat planes which are parallel to each other for interlocking the tool when the bolts are tightly fastened are provided on the head portions of the bolts. Unlike in the case of the nut, a space between the flat planes provided on the head portion of the bolt as a substantial entity can be reduced as much as possible so long as the necessary fastening force can be obtained. As a result, the bulk of the head portion as well as a space for the tool for interlocking to this head portion can be reduced.

In the case of the above-described double Cardan type constant velocity joint, if a torque to be transmitted becomes large, there arises a possibility that abrasion in a slide contact portion between the angle adjusting member and the support plate may be conspicuous. That is, the inner peripheral edge of the circular hole which is formed in the central portion of the support plate and the circumference of this circular hole in the central portions on the both sides of this support plate are contacted with an intermediate portion of the angle adjusting member in a sliding manner. When this torque becomes large, a facial pressure applied on the slide contact portion becomes large, lubricant film on this portion is worn off, and the metal forming the support plate and the metal forming the angle adjusting member are brought into direct contact, thereby causing a so-called metallic contact. If such metallic contact occurs, the abrasion on the slide contact portion progresses conspicuously, so that the durability of the double Cardan type constant velocity joint is deteriorated.

If one of the support plate and the angle adjusting member is made of a metal having a self-lubricating performance such as copper, or an oil impregnated metal having a low frictional coefficient, or a synthetic resin, such conspicuous abrasion can be avoided. However, these materials are expensive, as compared with steel (like copper and oil impregnated metal) or have a low rigidity (like copper and synthetic resin), or have a poor tenacity (like oil impregnated metal), so that they can not be employed depending on a use of the double Cardan type constant velocity joint. Thus, in some cases, it is inevitable to make both of the support plate and the angle adjusting member of steel. In order to avoid the above-mentioned abrasion, a coating layer of a low frictional material, such as poly-tetrafluoroethylene (PTFE) or molybdenum disulfide may be provided on the surface of the support plate. However, even when the coating layer is provided, if the torque to be transmitted is large, the abrasion-preventing effect of the layer over a long period may be in some cases unsatisfactory.

Still another object of the present invention is to provide a double Cardan type constant velocity joint which has overcome such problems.

According to the double Cardan type constant velocity joint of the present invention to achieve the last mentioned object, a slide bearing made of a low frictional material is additionally provided on a portion which is partly contacted in a sliding manner to the angle adjusting member on the both sides of the central portions of the support plate and on the inner peripheral edge of the circular hole, so as to prevent the direct friction between the metal for forming the support plate and the metal for forming the angle adjusting member.

The operation of the double Cardan type constant velocity joint of the present invention which is structured as described immediately above when the rotating force is transmitted to and from the first yoke and the second yoke, while securing the constant velocity, are the same as those of the foregoing double Cardan type constant velocity joint.

Especially, in the case of the double Cardan type constant velocity joint of the present invention described immediately above, the metal for forming the support plate and the metal for forming the angle adjusting member are not brought into direct friction because of the presence of the slide bearing. For this reason, even if the torque to be transmitted is large, a conspicuous abrasion is not brought about in the slide contact portion between the support plate and the angle adjusting member.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Figure 1:
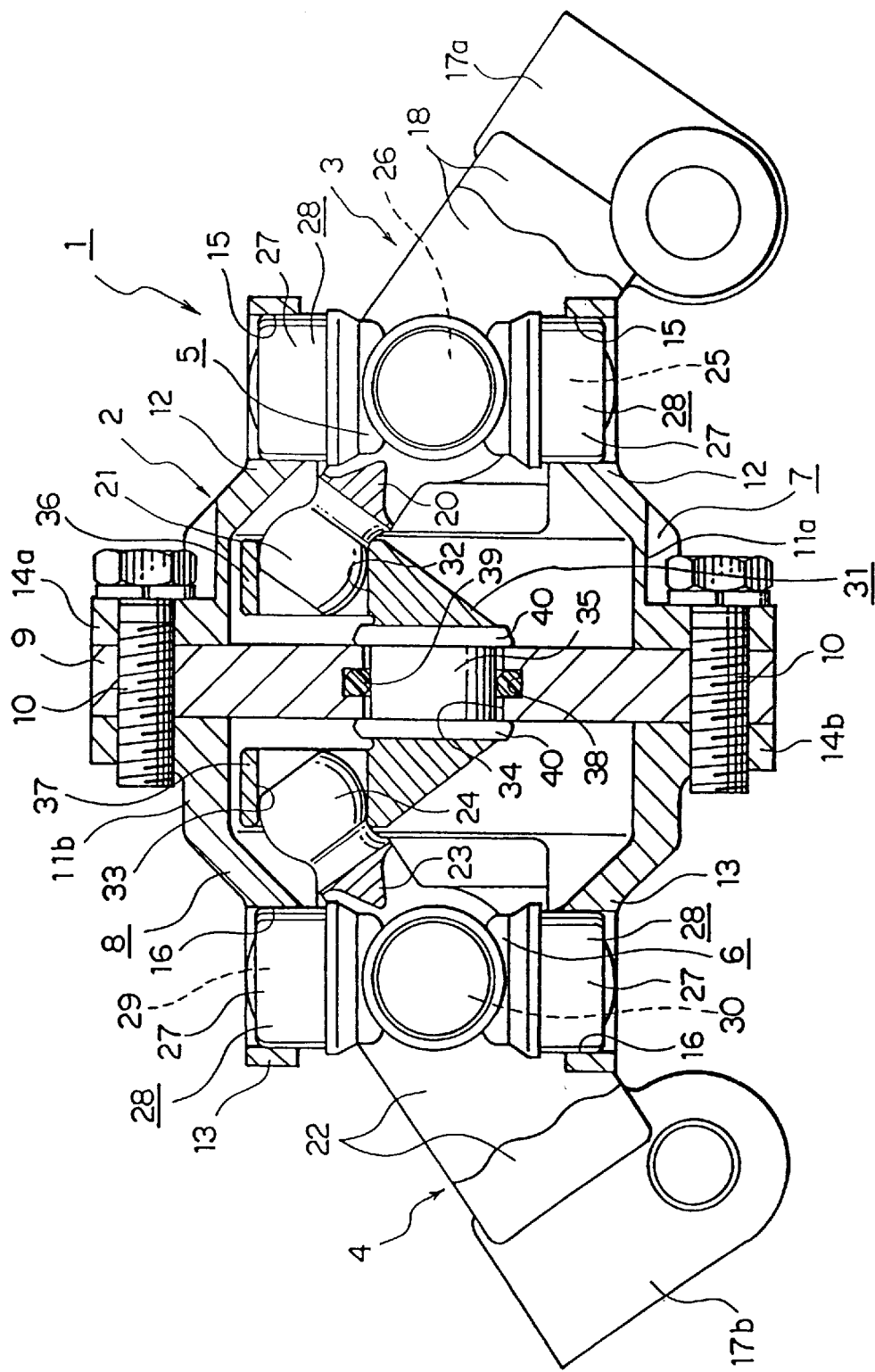
FIG. 1 is a partial cut-away side view showing a first embodiment of the present invention.
Figure 2:
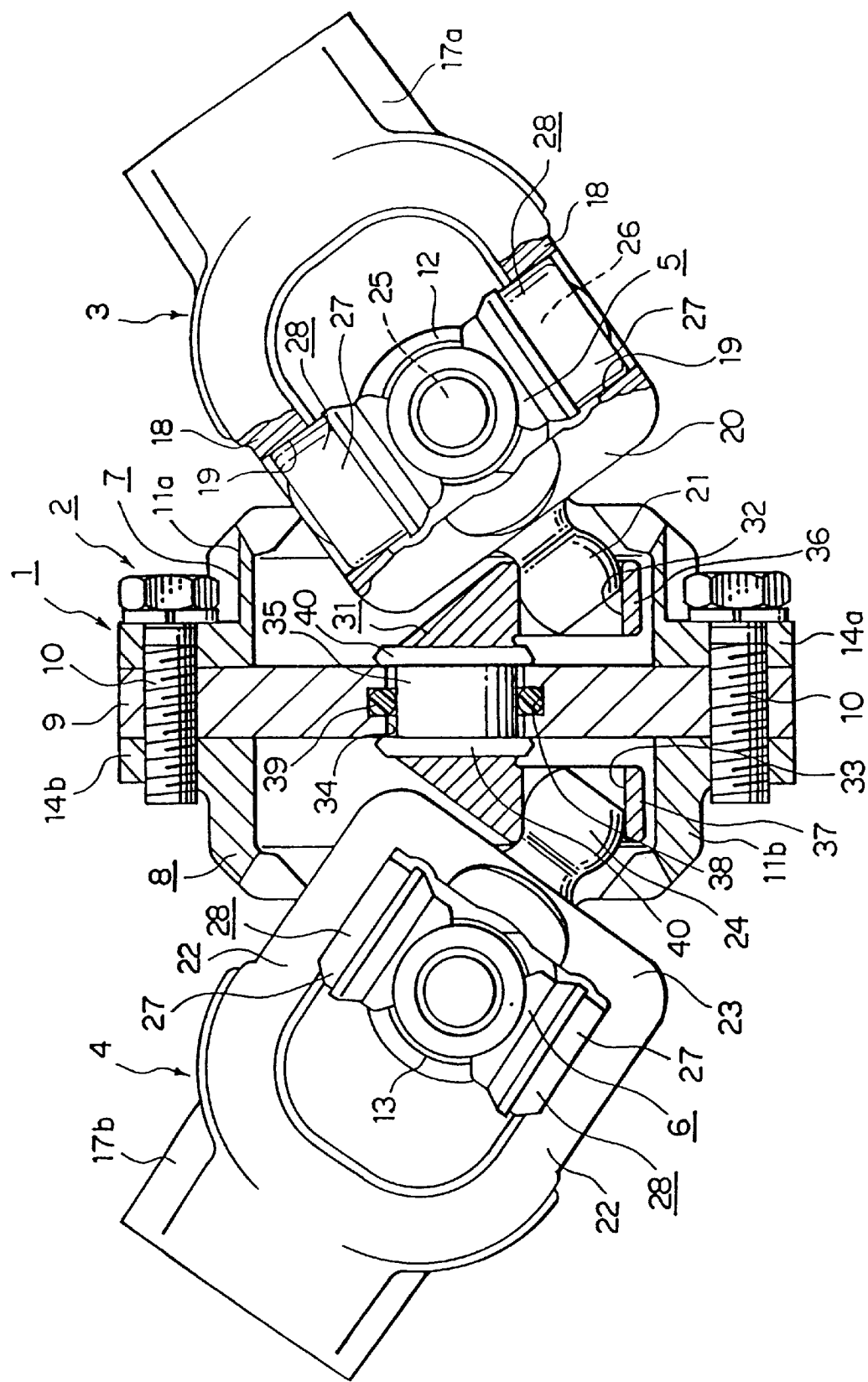
FIG. 2 is a view showing a state where first and second yokes are rotated through 90 degrees from the state shown in FIG. 1 as viewed from above in FIG. 1.
Figure 3:
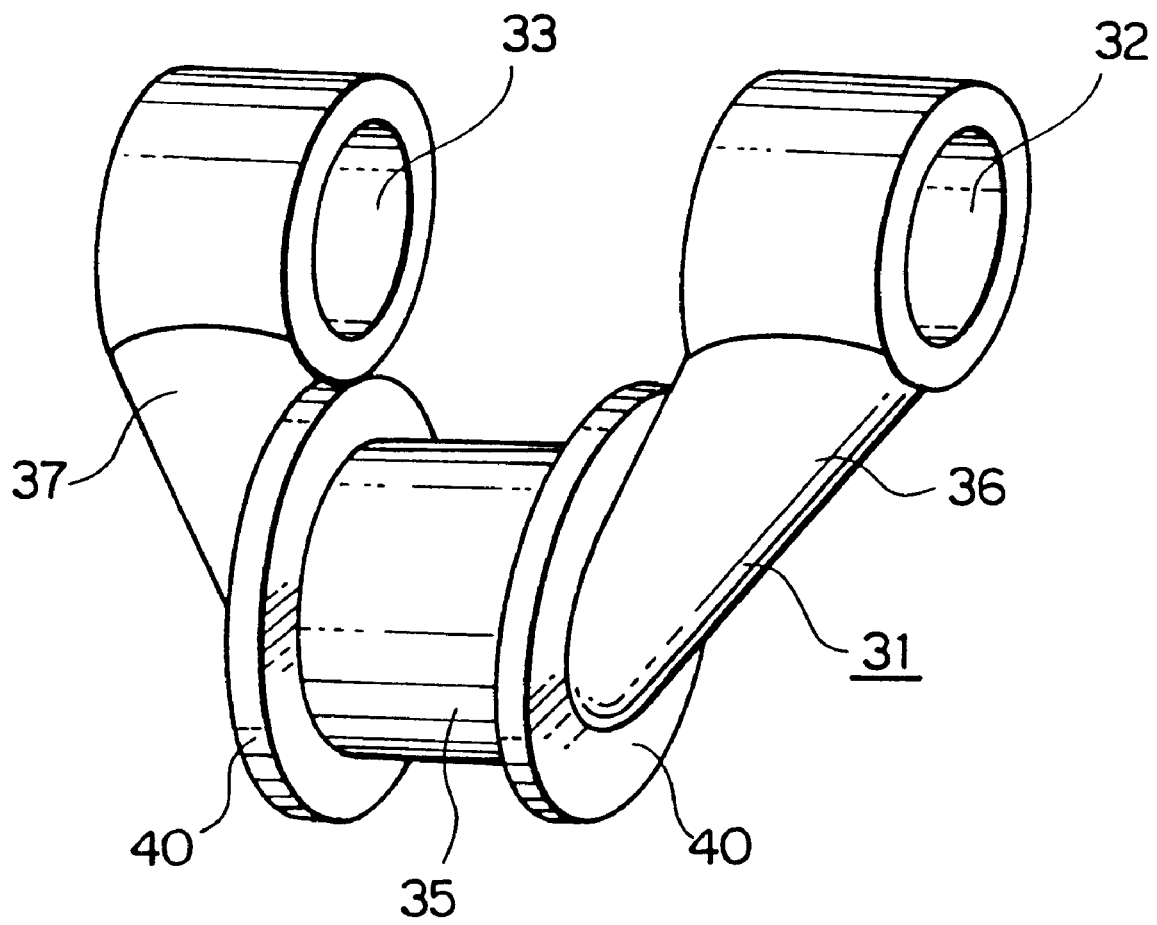
FIG. 3 is a perspective view of an angle adjusting member.

FIGS. 1–3 illustrate a first embodiment of the present invention. A double Cardan type constant velocity joint 1 according to the present invention includes a intermediate housing 2, first and second yokes 3, 4, a first cross shaft 5 for connecting the first yoke 3 to the intermediate housing 2, and a second cross shaft 6 for connecting the second yoke 4 to the intermediate housing 2.

Among these components, the intermediate housing 2 is constructed by making an annular support plate 9 sandwiched in between the first housing element 7 and a second housing element 8, and connecting these three members 7–9 with bolts 10, 10. Among these members, the first housing element 7 includes a circular cylindrical portion 11a formed at a proximal portion (a left end portion in FIGS. 1 and 2) that is, at the side of the above support plate 9, and a pair of first support arms 12, 12 respectively extending in axial directions from two positions opposite to a diametrical direction of a front edge (a right edge in FIGS. 1 and 2) of this circular cylindrical portion 11a. Further, the second housing element 8 includes a circular cylindrical portion 11b formed at a proximal portion (a right end portion in FIGS. 1 and 2), that is, at the side of the above support plate 9, and a pair of second support arms 13, 13 respectively extending in axial directions from two positions opposite to the diametrical direction of a front edge (a left edge in FIGS. 1 and 2) of this circular cylindrical portion 11b. Outer peripheral surfaces of the proximal portions of the above circular cylindrical portions 11a, 11b are respectively formed with flange portions 14a, 14b through which the above bolts 10, 10 are fastened in such a state as to hold close-to-outer-periphery portions of the support plate 9.

In a state where the intermediate housing 2 is assembled by thus connecting and fixing the three members 7–9, the pair of first support arms 12, 12 are provided at one axis-directional end (a right end in FIG. 1 and 2) of the intermediate housing 2, while the pair of second support arms 13, 13 are provided at the other axis-directional end (a left end in FIGS. 1 and 2) in equiphase with each other. End portions of the first support arms 12, 12 among these first and second support arms 12, 12, 13, 13 are respectively formed with first support holes 15, 15 concentric to each other. End portions of the second support arms 13, 13 are respectively formed with second support holes 16, 16 concentric to each other.

Further, the first yoke 3 is integrally manufactured by press-working or forge-working of a metal material. This first yoke 3 has a first connecting cylindrical portion. 17a to which an end portion of an unillustrated rotary shaft such as a steering shaft or the like can be connected and fixed, and a pair of third support arms 18, 18 provided at one axis-directional end (a left end in FIGS. 1 and 2) of this connecting cylindrical portion 17a. Close-to-front-end portions (close-to-left-end portions in FIGS. 1 and 2) of these third support arms 18, 18 are respective formed with third circular support holes 19, 19 concentric to each other. Furthermore, the ends of the third support arms 18, 18 are connected to each other through a first connecting portion 20. Then, an intermediate portion of this first connecting portion 20 is formed with a first engagement protrusion 21 protruding opposite to the first connecting cylindrical portion 17a. An outer peripheral surface of the front end portion of this first engagement protrusion 21 is formed as a single spherical convex surface.

Also, the second yoke 4 is integrally manufactured by the press-working or forge-working of the metal material in the same way as the first yoke 3. This second yoke 4 has a second connecting cylindrical portion 17b to which an end portion of another unillustrated rotary shaft such as an intermediate shaft or the like can be connected and fixed, and a pair of fourth support arms 22, 22 formed at one axis-directional end (a right end in FIGS. 1 and 2) of this second connecting cylindrical portion 17b. Close-to-front-end portions (close-to-right-end portions in FIGS. 1 and 2) of these fourth support arms 22, 22 are respectively formed with fourth support holes concentric to each other. Further, front ends of the fourth support arms 22, 22 are connected to each other through a second connecting portion 23. Then, an intermediate portion of this second connecting portion 23 is formed with a second engagement protrusion 24 protruding opposite to the connecting cylindrical portion 17b. An outer peripheral surface of the end portion of this second engagement protrusion 24 is also, as in the same way with the outer peripheral surface of the end of the first engagement protrusion 21, formed as a single spherical convex surface. Note that the first and second engagement protrusions 21, 24 are respectively formed integrally with the first and second yokes 3, 4. These first and second engagement protrusions 21, 24 that have been formed separately can be, however, fixed afterward to the first and second yokes 3, 4 by welding, fastening with screws and so forth.

Then, of first and second shaft portions 25, 26 constituting the first cross shaft 5 in the mutually intersecting state, both end portions of the first shaft portion 25 are rotatably supported inwardly of the first support holes 15, 15 through radial needle bearings 28, 28 constructed individually including bearing cups 27, 27. Further, both end portions of the second shaft portion 26 are rotatably supported inwardly of the third support holes 19, 19 through the radial needle bearings 28, 28. Further, of third and fourth shaft portions 29, 30 constituting the second cross shaft 6 in the mutually intersecting state, both end portions of the third shaft portion 29 are rotatably supported inwardly of the second support holes 16, 16 through the radial needle bearings 28, 28, and both end portions of the fourth shaft portion 30 are rotatably supported inwardly of the fourth support holes through the radial needle bearings 28, 28.

Further, an axis-directional intermediate portion of the intermediate housing 2 is provided with an angle adjusting member 31 displaceable with respect to the intermediate housing 2. Both end portions, in axial directions (a right and left directions in FIGS. 1–3), of this angle adjusting member 31 are formed with first and second engagement holes 32, 33 in equiphase with each other (concentrically). The first engagement protrusion 21 engages with the first engagement hole 32 in a freely oscillatable displaceable manner, while the second engagement protrusion 24 engages with the second engagement hole 33 in the same manner, whereby tilt angles of the first and second yokes to the intermediate housing 2 are made coincident with each other.

A characteristic of the double Cardan type constant velocity joint 1 according to the present invention, as described above, lies in a structure of the portion provided with the angle adjusting member 31 for making the tilt angles of the first and second yokes 3, 4 to the intermediate housing 2, coincident with each other. Providing this angle adjusting member 31 involves forming a circular hole 34 in a central portion of the support plate 9 fixed to the axis-directional intermediate portion of the intermediate housing 2, and forming this support plate 9 in an annular shape. Then, an intermediate portion 35 of the angle adjusting member 32 is rotatably supported inwardly of this circular hole 34. In the case of the illustrative example, a securing recessed groove 38 is formed in an axis-directional intermediate portion of an inner peripheral surface of the circular hole 34, and an O-ring 39 is secured to the inside of this securing recessed groove 38. A portion, protruding from the inner peripheral surface of the circular hole 34, of the inner peripheral edge of this O-ring 39, elastically impinge upon an outer peripheral surface of the intermediate portion 35. Accordingly, the intermediate portion 35 is so sustained inwardly of the circular hole 34 without any backlash as to be rotatable and slightly displaceable in the diametrical directions. Note that an assembly error or the like of each portion can be also absorbed by forming a gap between the inner peripheral surface of the circular hole 34 and the outer peripheral surface of the intermediate portion 35.

Further, collar portions 40, 40 each assuming an outward flange-like shape are provided at both end portions, in the axial direction, of the intermediate portion 35. These collar portions 40, 40 are set in a face-to-face relationship with openings of the circular hole 34 at both ends. A gap between these collar portions 40, 40 is slightly larger than a thickness of the support plate 9. Moreover, a major diameter of each of the two collar portions 40, 40 is larger than a minor diameter of the circular hole 34. Hence, both ends of a circularly-cylindrically-shaped gap existing in between the outer peripheral surface of the intermediate portion 35 and the inner peripheral surface of the circular hole 34 are covered with the two collar portions 40, 40. Further, with the engagements of the two collar portions with both surfaces of the support plate 9, it is feasible to prevent a central axis of the intermediate portion 35 of the angle adjusting member 31 and a central axis of the intermediate housing 2 from being incoincident (non-parallel) with each other. Note that if portions between these two collar portions 40, 40 and both surfaces of the support plate 9 are provided inside with seats made of low-friction materials such as nylon, polyacetal, PTFE, etc., or alternatively if one or both of the surfaces are coated, frictional resistances of the relevant portions are reduced, and this might contribute to decrease noises and a transmission loss caused when transmitting the rotating force.

The above angle adjusting member 31 is formed in a crank type on the whole, and includes the cylindrical intermediate portion 35, and first and second crank portions 36, 37 bent in the same direction as the diametrical direction of the intermediate portion 35, from the two axis-directional end surfaces of the intermediate portion 35. The first engagement hole 32 of the two first and second engagement holes 32, 33 is formed in the end portion of the first crank portion 36, while the second engagement hole 33 is formed in the end portion of the second crank portion 37. Inner peripheral surfaces of these first and second engagement holes 32, 33 each take a cylindrical shape and are concentric to each other. Furthermore, a minor diameter of each of the two first and second engagement holes 32, 33 is set slightly larger than the diameter of the single spherical convex surface formed on the front end portion of each of the two first and second engagement protrusions 21, 24. Hence, these two first and second engagement protrusions 21, 24 are so engaged with the inside portions of the two first and second engagement holes 32, 33 without any backlash as to be oscillatable.

Note that when actually assembling the structure as shown in FIGS. 1 and 2, at least one member of the support plate 9 and the angle adjusting member 31 is required to have a two-division structure. When the support plate 9 takes the two-division structure, this support plate 9 is divided into two portions in a diametrical direction of the circular hole 34, and this support plate 9 and the two first and second housing elements 7, 8 are connected and fixed by use of the bolts 10, 10. In this state, the support plate 9 is constructed in the annular configuration. Moreover, if the angle adjusting member 31 takes the two-division structure, for example, it is divided in a direction perpendicular to the axial direction between the intermediate portion 35 and one collar portion 40, and, with this dividing portion being a boundary, one divided portion is formed with a male screw, while the other divided portion is formed with a screw hole, respectively. The two parts of the male screw and the screw hole that are inserted from the side opposite to circular hole 34, are screwed-fitted and fastened inwardly of the circular hole 34. Furthermore, one portion and the other portion are serration-engaged with each other and thereafter can be also fastened by screw-fitting or caulking. As a matter of course, in a state where the above one and the other parts are connected, the two first and second engagement holes 32, 33 are set concentric to each other.

In the case of the thus constructed double Cardan type constant velocity joint 1 according to the present invention, when rotating the first yoke 3, a rotating force thereof is transmitted to the second yoke 4 via the first cross shaft 5, the intermediate housing 2 and the second cross shaft 6. Based on this transmission of the rotating force, there changes a positional relationship between the first and second yokes 3, 4 and the intermediate housing 2. That is, when the rotating force is transmitted, the two first and second yokes 3, 4 rotate in positions as they are. In other words, the central axis of the first and second connecting cylindrical portions 17a, 17b constituting the first and second yokes 3, 4, never displaces. Accordingly, there are not shifted positions of the two first and second engagement holes 32, 33 with which engage the two first and second engagement protrusions 21, 24 formed at the end portions of the first and second yokes 3, 4. In contrast with this, the intermediate housing 2 is rotated by a rotational driving force transmitted to the first support arms 12, 12 from the second shaft portion 26 constituting the first cross shaft 5. As a result, as discussed above, the positional relationship between the first and second cross shafts 5, 6 and the intermediate housing 2, changes. A direction of this shift, when viewed from, e.g., the intermediate housing 2 (on the assumption that the intermediate housing 2 is fixed unlike the actual case), is the one in which the first and second yokes 3, 4 make oscillating movements with tilts about the intermediate housing 2. Hence, when transmitting the rotating force between these first and second yokes 3, 4, the intermediate housing 2 rotates about the intermediate portion 35 of the angle adjusting member 31, along the periphery of this angle adjusting member 31.

Thus, when the rotating force is transmitted between the first and second yokes 3, 4, the angle adjusting member 31 rotates about the intermediate portion 35. This angle adjusting member 31 does not, however, displace in the diametrical direction of the intermediate housing 2 at all. Accordingly, a diameter of the intermediate housing 2 is set enough to permit the rotation of the angle adjusting member 31. Therefore, as in the case of the prior art structure disclosed in each of the above Patent Publications, an installation space thereof can be set smaller by reducing a swing circle of the double Cardan type constant velocity joint 1 with a decreased diameter of the intermediate housing 2 than by using a sliding plate for the angle adjusting member 31.

Further, the rotation of the angle adjusting member 31 resists only a frictional force acting on between the outer peripheral surface of the cylindrical intermediate portion 35 provided at the angle adjusting member 31, and an inner peripheral edge of the O-ring 39 secured to the inner peripheral surface of the circular hole 34 formed in the support plate 9 of the intermediate housing 2, and is performed lightly. Accordingly, a loss of force when transmitting the rotating force is small.

Moreover, the intermediate portion 35 serving as the rotation support portion of the angle adjusting member 31 is not exposed to an external space, and, besides, the installing portions of the first and second cross shafts 5, 6 can be surely spaced away from each other by the support plate 9 for supporting the angle adjusting member 31. Therefore, it is feasible to easily prevent foreign matters such as dusts or the like from permeating the radial needle bearings 28, 28 and the intermediate portion 35, which serve as the rotation support portions of the first and second cross shafts 5, 6 and the angle adjusting member 31 as well. This facilitates an enhancement of durability owing to the prevention of abrasion of each rotation support portion.

Figure 4:
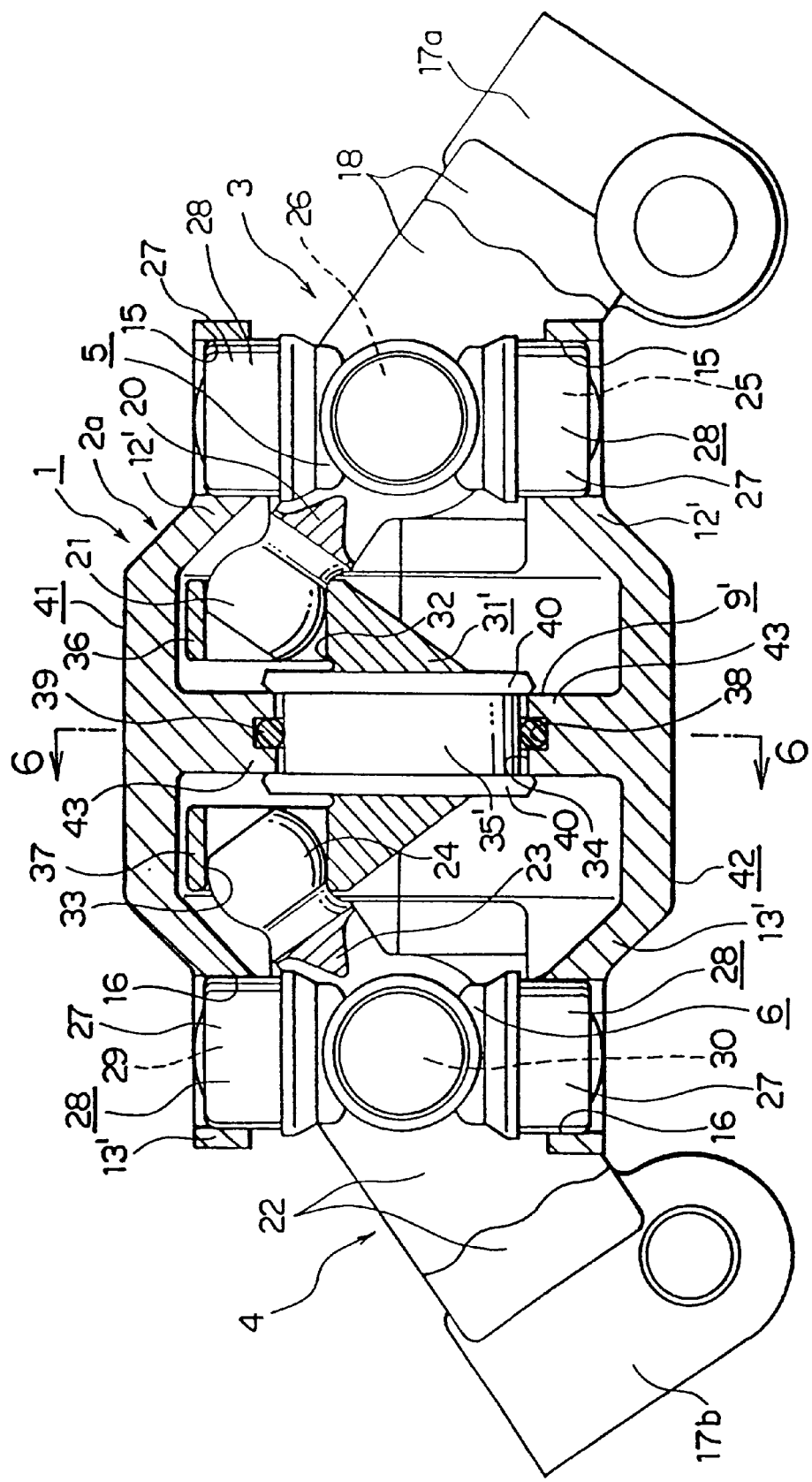
FIG. 4 is a partial cut-away side view showing a second embodiment of the present invention.
Figure 5:
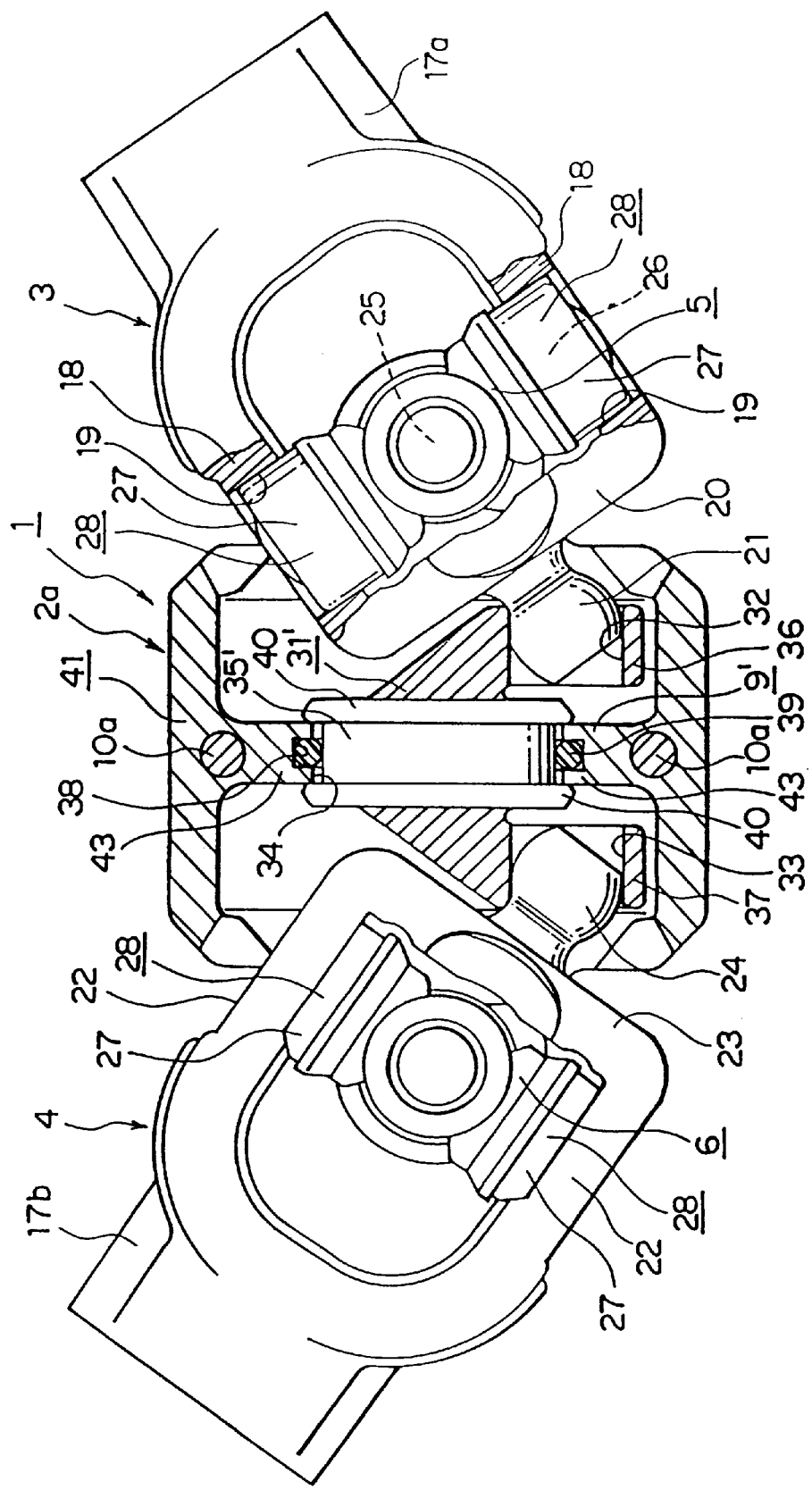
FIG. 5 is a view showing a state where the first and second yokes rotate through 90 degrees from the state in FIG. 4 as viewed from above in FIG. 4.
Figure 6:
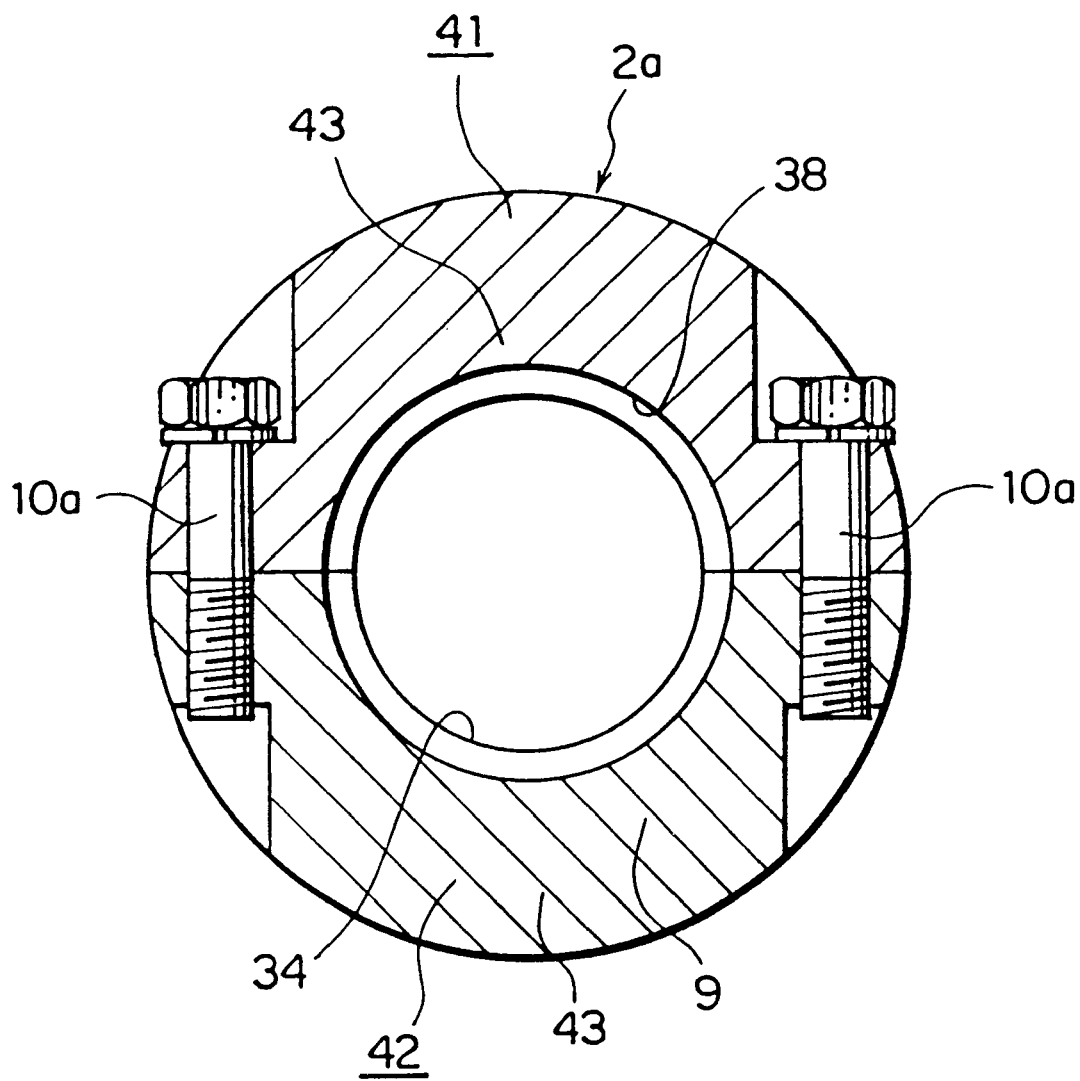
FIG. 6 is a sectional view taken along the line 6—6 in FIG. 4, illustrating only an intermediate housing taken out.

Next, FIGS. 4–6 illustrate a second embodiment of the present invention. In the case of the second embodiment, an intermediate housing 2a takes a two division structure in which the housing 2a is dividable in the diametrical direction. More specifically, the intermediate housing 2a is constructed in such a way that two pieces of first and second housing elements 41, 42 each integrally manufactured by semi-body forging, skiving or casting of the metal material, are centrally superposed on each other and connectively fixed with a pair of bolts 10a, 10a. Intermediate portions of the inner peripheral surfaces of the housing elements 41, 42 are formed with semi-annular support plate elements 43, 43 integrally with the respective housing elements 41, 42. The two support plate elements 43, 43 are assembled one another to constitute the annular support plate 9' in a state where those two housing elements 41, 42 are assembled. Other configurations and operations are the same as those in the first embodiment discussed above, and therefore the same portions are marked with the like numerals with an omission of repetitive explanations.

Figure 7:
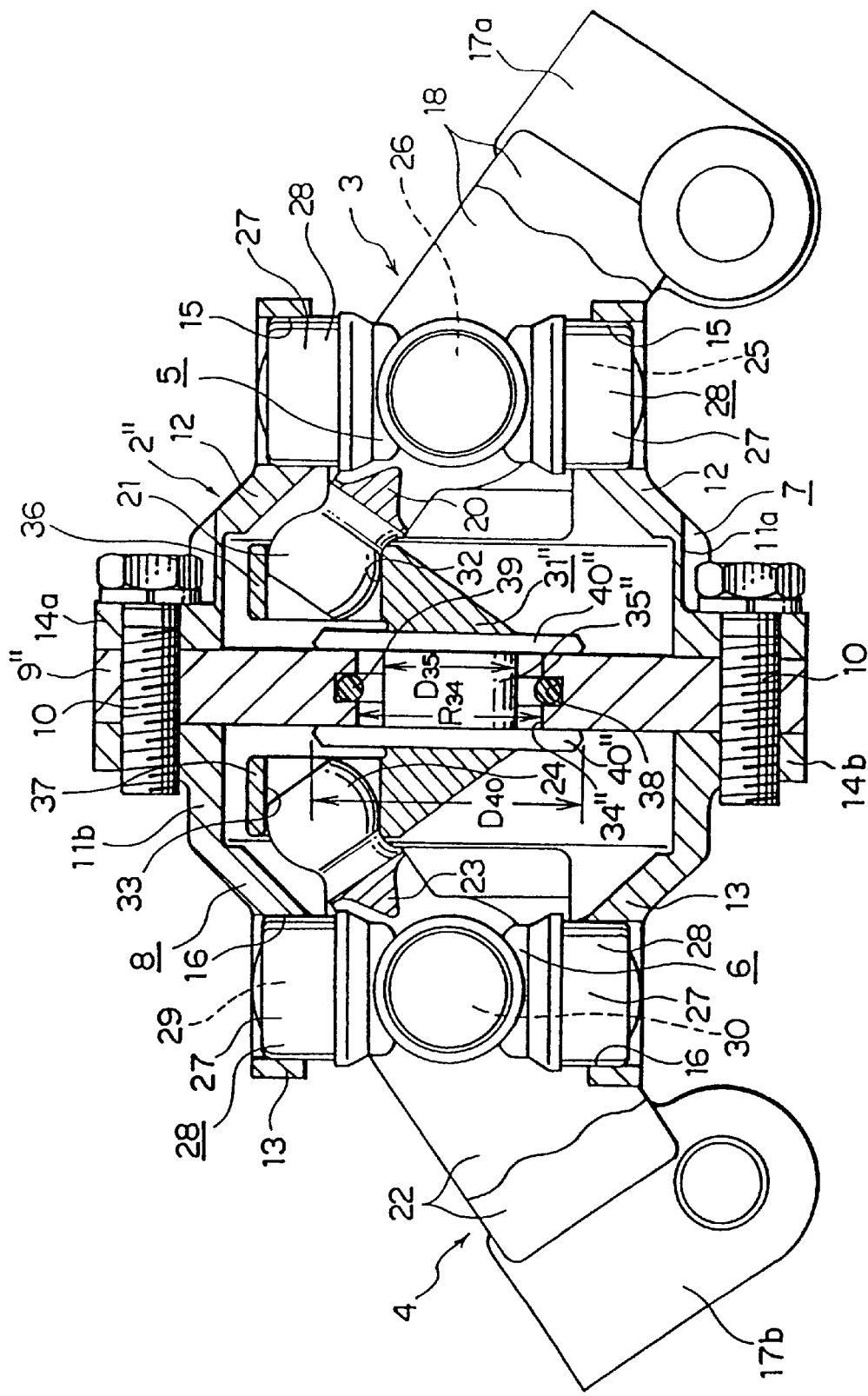
FIG. 7 is a partial cut-away side view showing a third embodiment of the present invention.
Figure 8:
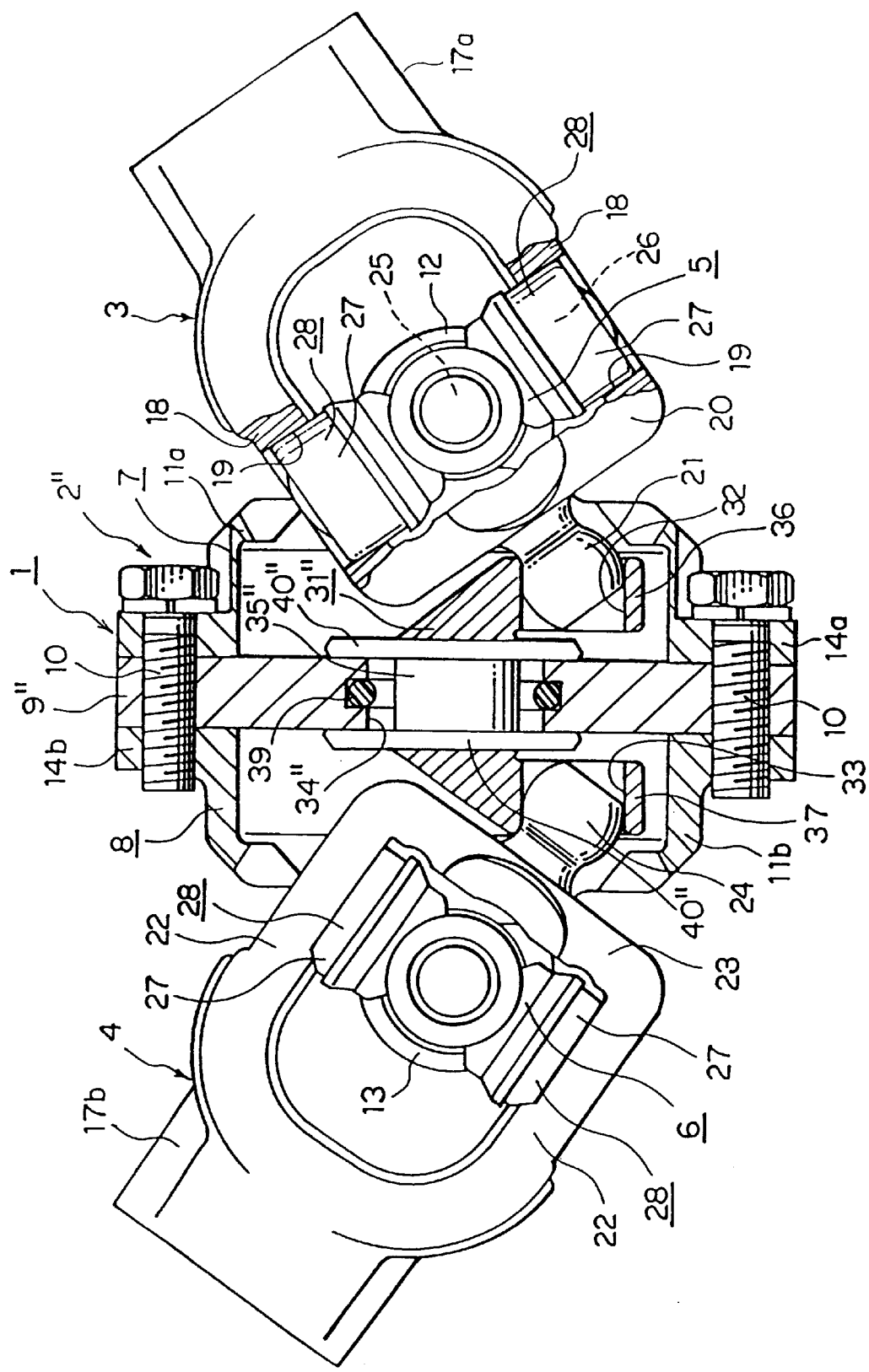
FIG. 8 is a view showing a state where the first and second yokes rotate through 90 degrees from the state in FIG. 7 as viewed from above in FIG. 7.

Next, FIGS. 7 and 8 show a third embodiment of the present invention, wherein the above-mentioned additional requirements (1)–(3) are added to the first embodiment given above. That is, in the case of the third embodiment, a minor diameter $R_{34}$ (FIG. 7) of the circular hole 34" formed in the support plate 9" is set sufficiently larger than a major diameter $D_{35}$ (FIG. 7) ($R_{34}>D_{35}$) of the intermediate portion 35" of the angle adjusting member 31". Accordingly, in the third embodiment, this intermediate portion 35" is freely displaceable in the radial directions inwardly of the circular hole 34". Further, an area of the portion sliding on a part of the support plate 9", which portion is a part of the angle adjusting member 31", is set properly large, and hence a major diameter $D_{40}$ of each of the collar portions 40", 40" is set well larger than the minor diameter $R_{34}$ ($D_{40}>R_{34}$) of the circular hole 34".

As discussed above, the minor diameter $R_{34}$ of the circular hole 34" is set sufficiently larger than the major diameter $D_{35}$ of the intermediate portion 35" of the angle adjusting member 31", and this intermediate portion 35" is set freely displaceable in the radial direction inwardly of the circular hole 34". With this arrangement, it is feasible to increase a degree at which to absorb an assembly error (allowable error) caused when the double Cardan type constant velocity joint 1" of the present invention is incorporated into the steering apparatus of an automobile, and an error (allowable error) attributed to a deformation or the like occurred by an accident of collision. Further, the major diameter $D_{40}$ of each of the collar portions 40", 40" formed at both ends, in the axial direction, of the intermediate portion 35", is set well larger than the minor diameter $R_4$ of the circular hole 34", thereby properly increasing the area of the portion at which one surfaces of the respective collar portions 40", 40" that are a part of the angle adjusting member 31" slide on the opening peripheral portions of both ends of circular hole 34". Thus, it is possible to restrain the abrasion of the slide portion between the angle adjusting member 31" and the support plate 9". That is, the abrasion can be restrained by preventing an excessive surface pressure from acting upon the slide portion because of the area of the slide portion being excessively narrowed. Besides, the degree at which the angle adjusting member 31" is inclined to the support plate 9", can be reduced by increasing the major diameter $D_{40}$ of each of the two collar portions 40", 40". As a result, it is feasible to restrain the backlash of the double Cardan type constant velocity joint 1 due to the tilt of the angle adjusting member 31".

Figure 9:
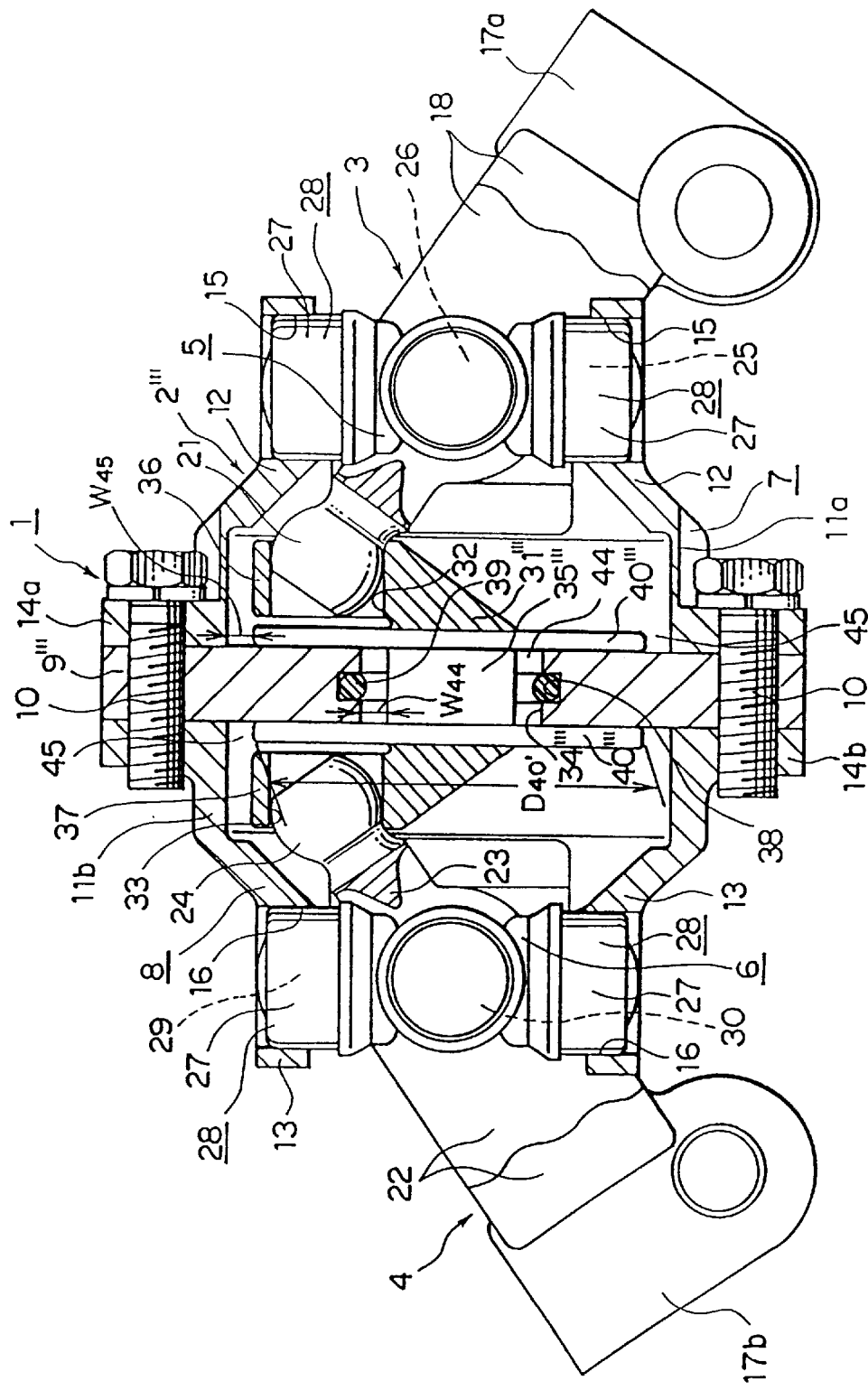
FIG. 9 is a partial cut-away side view illustrating a fourth embodiment of the present invention.
Figure 10:
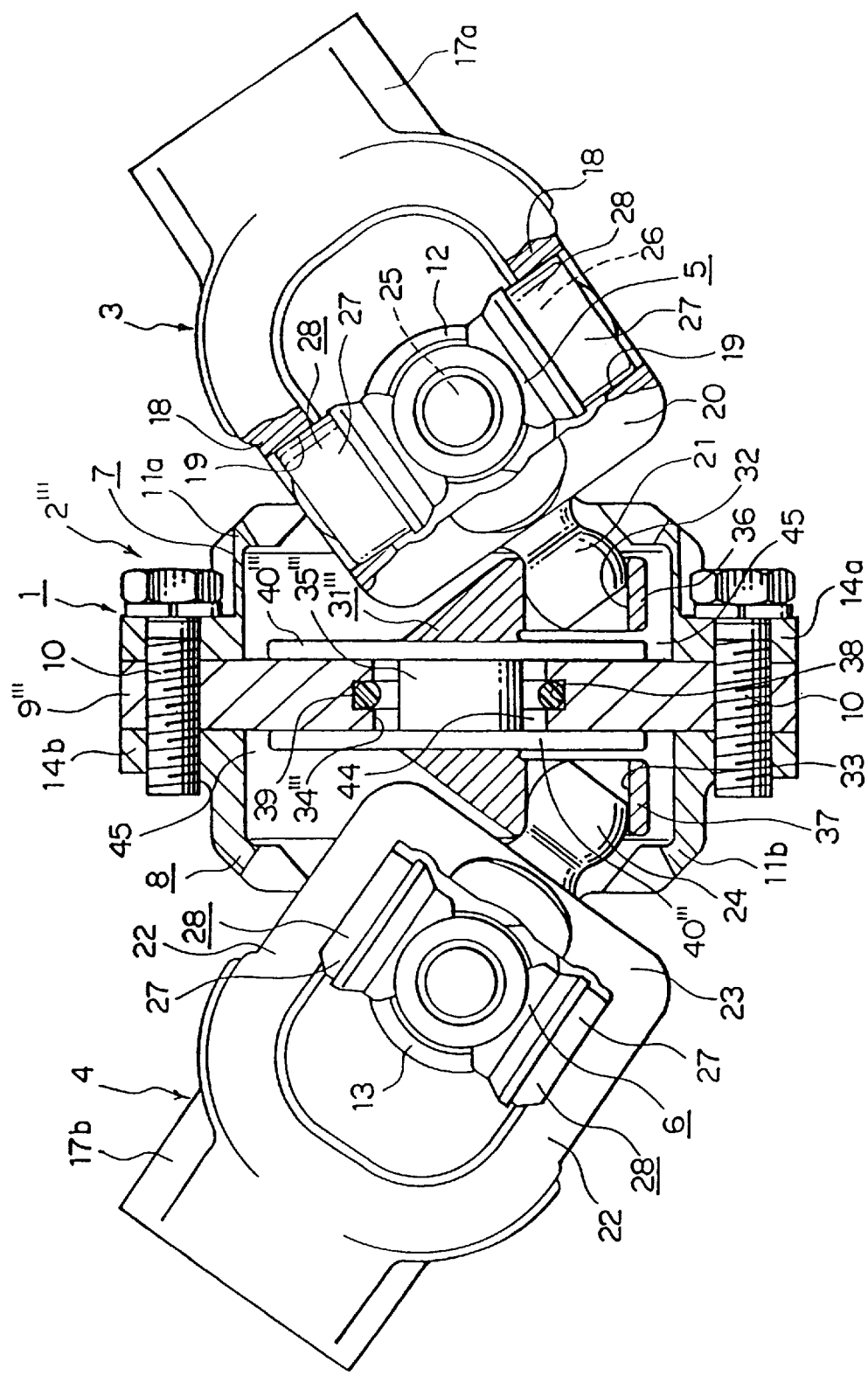
FIG. 10 is a view showing a state where the first and second yokes rotate through 90 degrees from the state in FIG. 9 as viewed from above in FIG. 9.

Next, FIGS. 9 and 10 show a fourth embodiment of the present invention, wherein the above-mentioned additional requirements (1)–(4) are also added to the first embodiment given above. That is, in the case of the fourth embodiment, a major diameter $D_{40}'$ (FIG. 9) of each of the collar portions 40", 40" provided on the angle adjusting member 31'" is set larger than in the third embodiment (FIGS. 7 and 8). Then, a dimension $W_{44}$ (FIG. 9), in the radial direction, of a minor diameter side gap 44 existing between the outer peripheral surface of the intermediate portion 35'" constituting the angle adjusting member 31 and the inner peripheral surface of the circular hole 34'" formed in the support plate 9'", is equalized to a dimension $W_{45}$ (FIG. 9) ($W_{44}=W_{45}$), in the radial direction, of a major diameter side gap existing between the outer peripheral edge of each of the collar portions 40'", 40'" and the inner peripheral surface of each of the cylindrical portions 11a, 11b of the first and second housing elements 7, 8, which surface partly constitutes the inner peripheral surface of the intermediate housing 2.

Thus, the major diameter dimension $D_{40}'$ of each of the collar portions 40'", 40'" is set large, and the dimensions of the respective portions are restricted, whereby the following operations and effects in addition those in the third embodiment discussed above can be obtained. That is, if the angle adjusting member 31'" displaces in the radial directions due to the fitting error, etc., the outer peripheral surface of the intermediate portion 35'" comes in contact with the inner peripheral surface of the circular hole 34'", and, at the same time, the outer peripheral edge of each of the collar portions 40'", 40'" is brought into contact with the partial inner peripheral surface of the first and second housing elements 7, 8. As a result, the force of displacing the angle adjusting member 31'" in the radial directions can be sustained at three places, and it is possible to prevent damages to the angle adjusting member 31'", the support plate 9'" against which this angle adjusting member 31'" is pushed, and the intermediate housing 2. Moreover, this is also effective in such a case that the O-ring and other elastic ring are provided at the inner peripheral edge of the circular hole 34'" formed in the support plate 9'" without forming the securing recessed groove 38 in order to reduce the costs. In this case, it is feasible to prevent the elastic ring from being cut off because of the outer peripheral edge of each of the collar portions 40'", 40'" coming into contact with the partial inner peripheral surface of the first and second housing elements before the angle adjusting member 31'" displaced in the radial directions strongly pushes the elastic ring.

Incidentally, the following construction may also be available. The major diameter dimension $D_{40}'$ of each of the collar portions 40'", 40'" is set much larger, and the dimension $W_{45}$ of the major diameter side gap 45 is set smaller than the dimension $W_{44}$ ($W_{45}<W_{44}$) of the minor diameter side gap 44. Then, if the angle adjusting member 31'" displaces in the radial directions, the outer peripheral edge of each of the collar portions 40'", 40'" having a large radius of curvature comes into contact with the partial inner peripheral surface of the first and second housing elements 7, 8. In this case also, the damages to the components of the double Cardan type constant velocity joint can be prevented by setting the area for sustaining the force acting in the radial directions than in the first through third embodiments illustrated in FIGS. 1–8.

Figure 11:
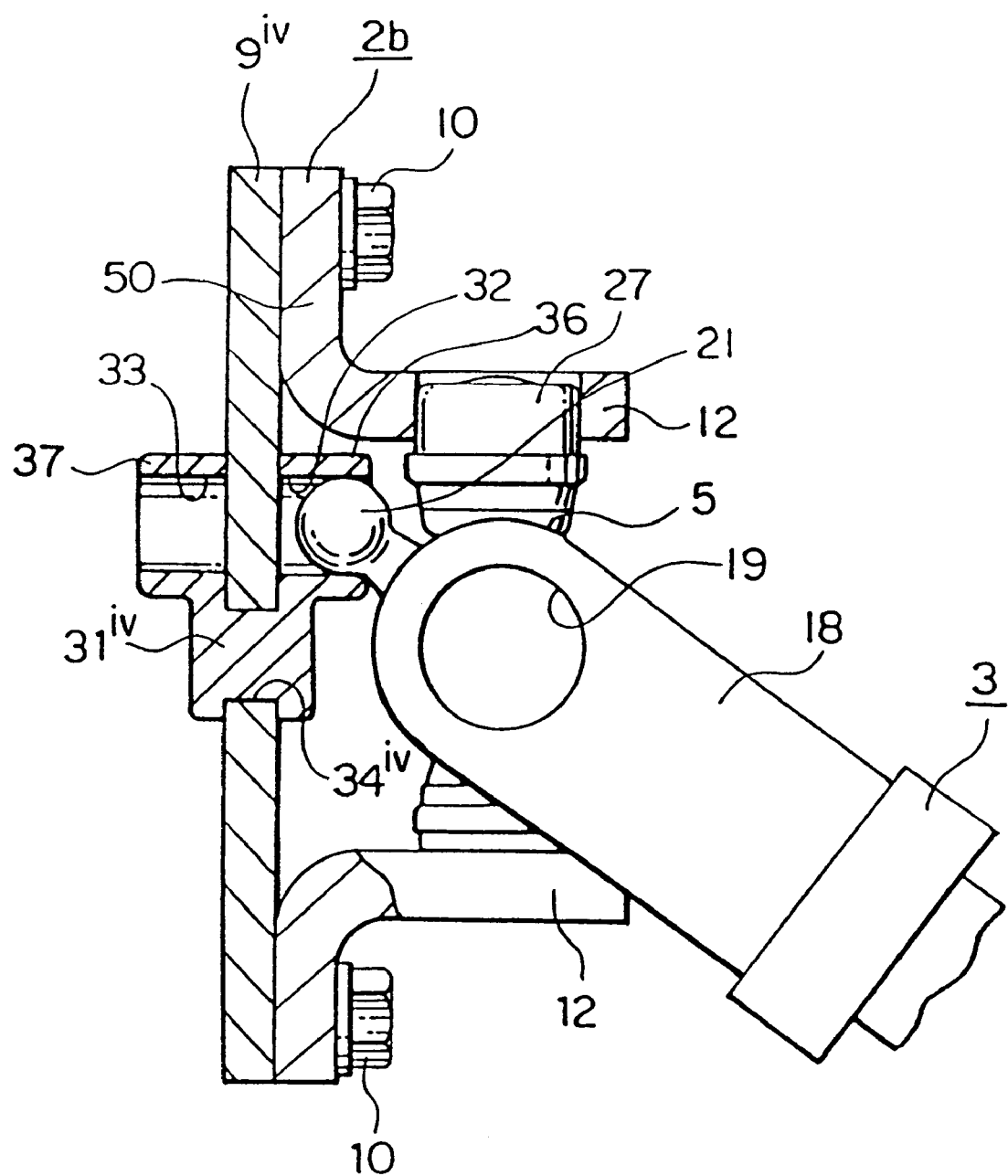
FIG. 11 is a partial sectional view illustrating a fifth embodiment.

Next, FIG. 11 shows a fifth embodiment of the present invention, wherein press-working is applied to the structure illustrated in FIGS. 1 and 2. In the case of the fifth embodiment, the support plate $9^{iv}$ is interposed in between a first intermediate housing element 2b manufactured by effecting press working on a steel sheet and an unillustrated second intermediate housing element formed in the same configuration as that of the first intermediate housing element 2b. Then, the first intermediate housing element 2b, the second intermediate housing element and the support plate $9^{iv}$ are joined with the bolts 10, 10. The crank type angle adjusting member $31^{iv}$ is rotatably supported in the circular hole $34^{iv}$ formed in the central portion of this support plate $9^{iv}$. In the case of the thus structured double Cardan type constant velocity, the costs thereof can be reduced by manufacturing the first intermediate housing element 2b, the unillustrated second intermediate housing element and further the support plate 9 by press-working the steel sheet.

Figure 12:
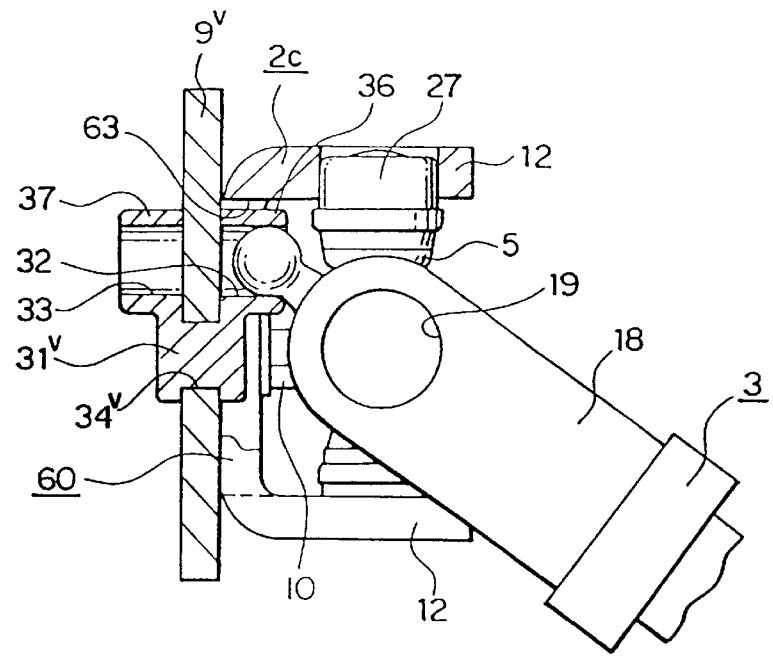
FIG. 12 is a partial sectional view showing a sixth embodiment.
Figure 13:
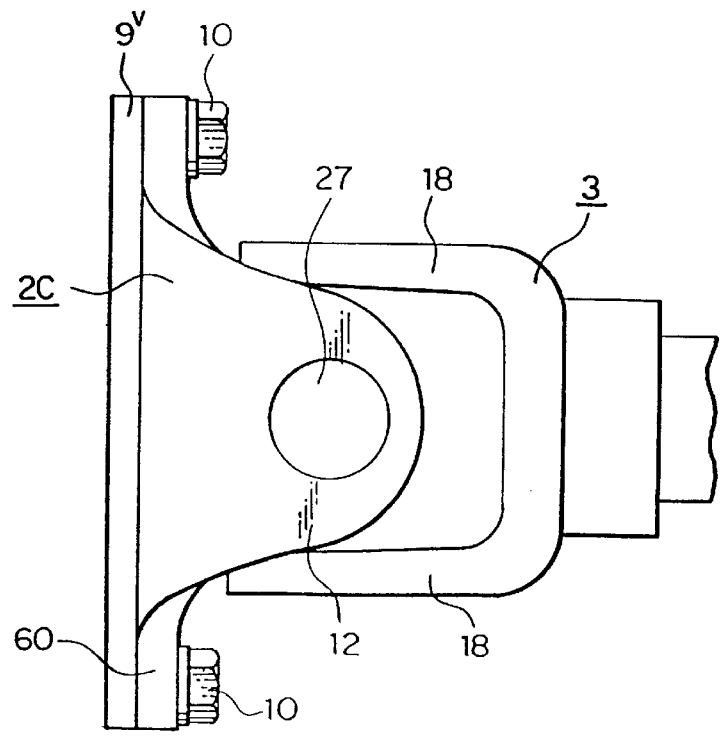
FIG. 13 is a view as viewed from above in FIG. 12.
Figure 14:
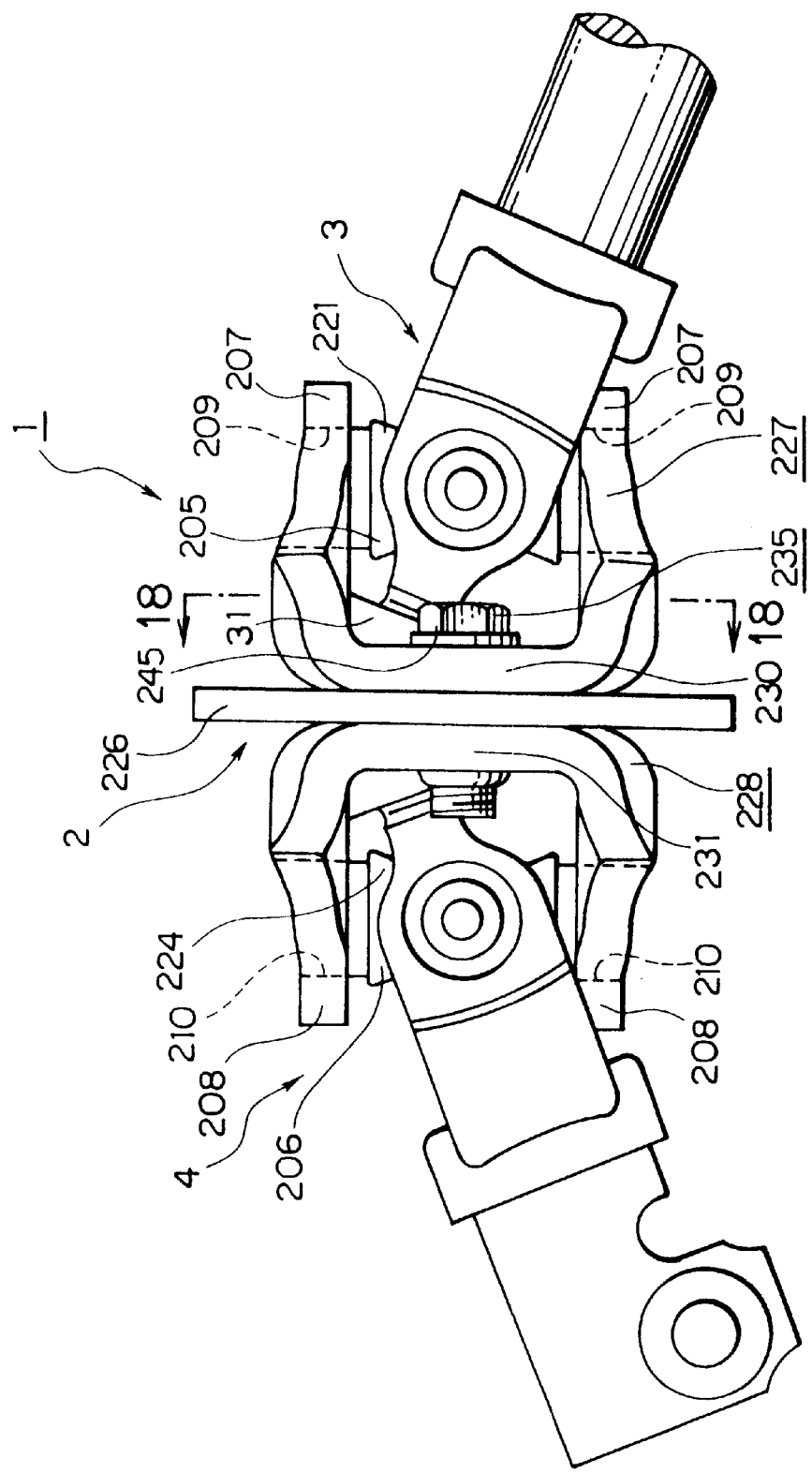
FIG. 14 is a side view showing a first example of a seventh embodiment of the present invention.
Figure 15:
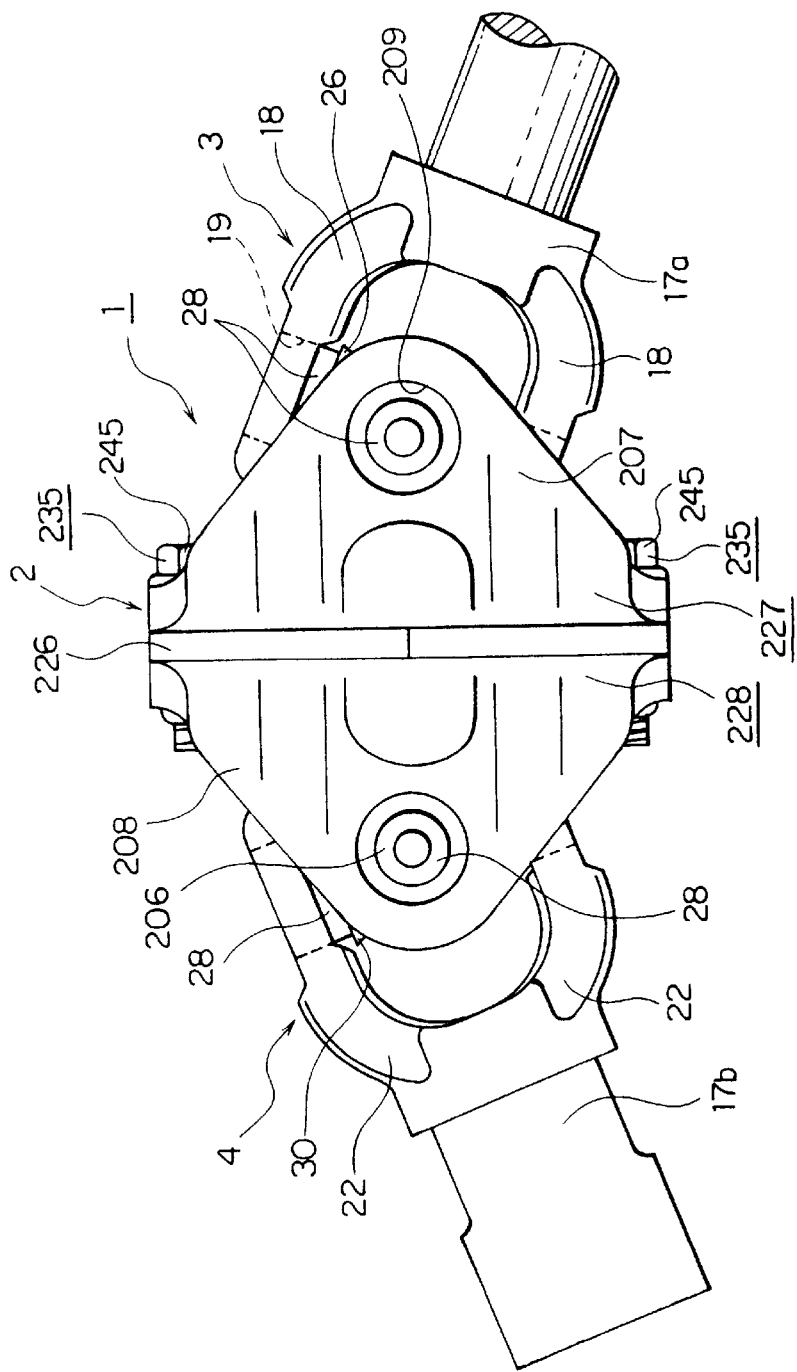
FIG. 15 is a side view showing a state rotated through 90 degrees from the state shown in FIG. 14.

Next, FIGS. 12 and 13 illustrate a sixth embodiment of the present invention, wherein press-working is applied to the structure shown in FIGS. 1 and 2. In the case of the above-described fifth embodiment, the central portion of a baseplate portion 60 is bent up to form the first support arms 12, 12. Contrastingly in the sixth embodiment, the steel sheet is press-worked, thereby forming a first intermediate housing element 2c in which this steel sheet is bent in a U-shape, and the first support arms 12, 12 are formed at both end portions of a baseplate portion 60. The central portion of the above baseplate portion 60 is formed with a through-hole 63 for permitting a rotary motion of the angle adjusting member 31. The support plate 9$^v$ is interposed in between the first intermediate housing element 2c and an unillustrated second intermediate housing element manufactured in the same configuration as the first intermediate housing element 2c by likewise press-working the steel sheet. Subsequently, the first intermediate housing element 2c, the second intermediate housing element and the support plate 9$^v$ are joined with the bolts 10, 10. In the case of the thus structured double Cardan type constant velocity also, as in the same way with the fifth embodiment discussed above, the costs thereof can be reduced by manufacturing the first intermediate housing element 2c, the unillustrated second intermediate housing element and further the support plate 9 by press-working the steel sheet.

The double Cardan type constant velocity joint according to the present invention is constructed and operates in the way described above, manufactured in a small size at low costs and is, besides, excellent in terms of the durability with a less loss of force. Hence, the double Cardan type constant velocity joint can contribute to enhance the performance and to facilitate the design of the apparatus incorporating this double Cardan type constant velocity joint as in the case of a steering apparatus, etc.

In accordance with the fifth and sixth embodiments of the present invention, the double Cardan type constant velocity joint is constructed and operates as described above, and it is therefore feasible to reduce the costs of the double Cardan type constant velocity joint by decreasing the costs for the materials of the parts as well as for working.

FIGS. 14 to 18 illustrate a first example of a seventh embodiment of the present invention. Note that a characteristic of the seventh embodiment lies in a structure of a portion for threadably engaging the front end portions of the bolts 235, 235 for connecting and fixing the support plate 226 for constituting the intermediate housing 2 to the first and second intermediate housing elements 227, 228, which are made of a metal plate by press working. Other structures and effects are the same as those according to the foregoing embodiments, so that description thereof will be omitted or simplified. Description will be chiefly made below on the characteristics of the present embodiment and novel structural parts which were not described in the foregoing embodiments.

Figure 16:
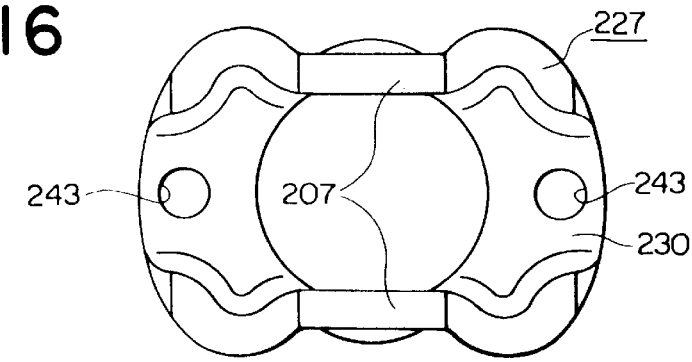
FIG. 16 is a view of the first intermediate housing element to be incorporated in the first example of the seventh embodiment, as viewed from right in FIG. 14.
Figure 17:
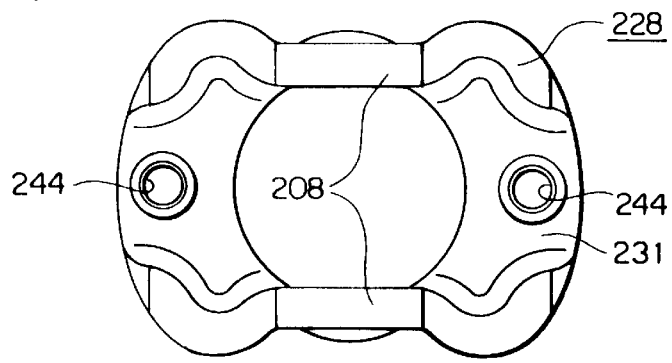
FIG. 17 is a view of the second intermediate housing element to be incorporated in the same example, as viewed from left in FIG. 14.

Out of the support plate 226 for constituting the intermediate housing 2 and the first and second intermediate housing elements 227, 228, circular holes 243, 244 into which the shank portions of the bolts 235, 235 (FIGS. 14 and 15) can be inserted are formed as shown in FIG. 16 at the positions on the both end portions of the support plate 226 and those on the both end portions of a first base plate 230 for constituting the first intermediate housing element 227 which are corresponding to each other. On the other hand, at the positions on the both end portions of a second base plate 231 for constituting the second intermediate housing element 228 and corresponding to the circular holes 243, 243, screw holes 244, 244 as shown in FIG. 17 are formed. When the support plate 226 is connected and fixed to the first and second intermediate housing elements 227, 228 in order to assemble the intermediate housing 2, the support plate 226 is made to be sandwiched in between the first and second base plates 230, 231. Then, male screw portions formed on the front end portions of the paired bolts 235, 235 which pass through the circular holes 243, 243 formed on the support plate 226 and the both end portions of the first base plate 230 are threadably engaged with the screw holes 244, 244 formed on the both end portions of the second base plate 231 to be further fastened.

In the case of the double Cardan type constant velocity joint according to the seventh embodiment of the present invention, as described above, the screw holes 244, 244 for threadably engaging the front end portions of the bolts 235, 235 are directly formed on the both end portions of the second base plate 232 which constitutes the second intermediate housing elements 228, so that the nuts can be omitted. As a result, the fastening work of these bolts 235, 235 can be conducted only by rotating the head portions of these bolts 235, 235, and the nuts are not required to be suppressed. Therefore, the connecting and fixing work of the support plate 226 to the first and second intermediate housing elements 227, 228 can be easily carried out. Also, when such fastening work is to be conduct, there is no need for keeping a space for inserting a spanner or other tool for suppressing the nuts, so that a degree of freedom in designing the configurations of the components such as the second intermediate housing element 228 and second yoke 4 can be enhanced.

Also, since no nut is protruding from any of the intermediate housing elements 227, 228, it is not required to take into consideration prevention of interference between the second yoke 4 and the nuts, so that the size of the intermediate housing 2 can be reduced by reducing a space between the paired bolts 235 or the like, and an installing space for this intermediate housing 2 can be minimized. Also, as the nuts are no longer required, the number of the components can be reduced and the total length of each of the bolts 235, 235 can be shortened, thereby reducing the costs of the components as well as the weight can be reduced. Also, it will suffice if the flat planes which are parallel to each other for interlocking the tool when the bolts 235, 235 are fastened are provided on the head portions 245, 245 of the bolts 235, 235. A space between these flat planes provided on the head portions of the bolts as substantial entities, unlike in the case of those provided on the nuts, can be reduced to the minimum so long as the necessary fastening force can be obtained. As a result, the bulk of the head portions as well as the space for inserting the tool for interlocking to the head portions 245, 245 can be reduced.

Further, in the illustrated example, the flexural rigidity of the first and second support arms 207, 208 for forming the first and second intermediate housing elements 227, 228 is enhanced, so as to prevent the spaces between the paired first support arms 207, 207 and the paired second support arms 208, 208, which are respectively opposite to each other, from extending, in spite of the force applied from the first and second cross shafts 205, 206 when a torque is transmitted. That is, when the torque is transmitted, a torquing force (including the counter-force thereof) is applied to the first and second support arms 207, 208 from the first and second cross shafts 205, 206. This force includes component forces in directions in which the space between the paired first support arms 207, 207 and that between the paired second support arms 208, 208 which are respectively opposite to each other are extended. For this reason, if the flexural rigidity of the support arms 207, 208 is low, the space between the paired first support arms 207, 207 and that between the paired second support arms 208, 208 which are respectively opposite to each other are extended, generating a possibility that the first and third shaft portions 221, 224 for forming the first and second cross shafts 205, 206 may be drawn out from the first and second support holes 209, 210 which are formed on the respective front end portions.

Figure 18:
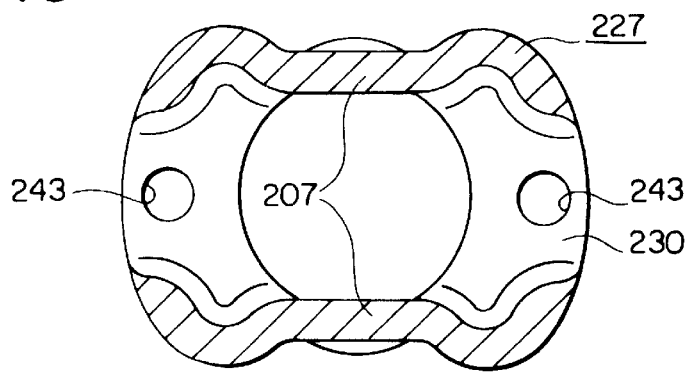
FIG. 18 is a view corresponding to the section 18—18 shown in FIG. 14, illustrating only the first intermediate housing element taken out.

On the other hand, in the illustrated example, as shown in FIG. 18, out of the first support arms 207, 207 for forming the first intermediate housing element 227 (the case of the second support arms 208, 208 for forming the second intermediate housing element 228 is the same), a sectional configuration of a basic half portion to which a great force is given by the principle of leverage is formed into a waveform, so as to obtain a large sectional coefficient for the basic half portion of the first support arms 207, 207. Thus, in spite of the above torquing force, the space between the paired first support arms 207, 207 and that between the paired second support arms 208, 208, which are opposite to each other, are difficult to be extended, so that the first and third shaft portions 221, 224 can not be drawn out from the first and second support holes 209, 210 even when a large torque is transmitted. As a result, it becomes possible to realize a double Cardan type constant velocity joint capable of transmitting a large torque.

Figure 20:
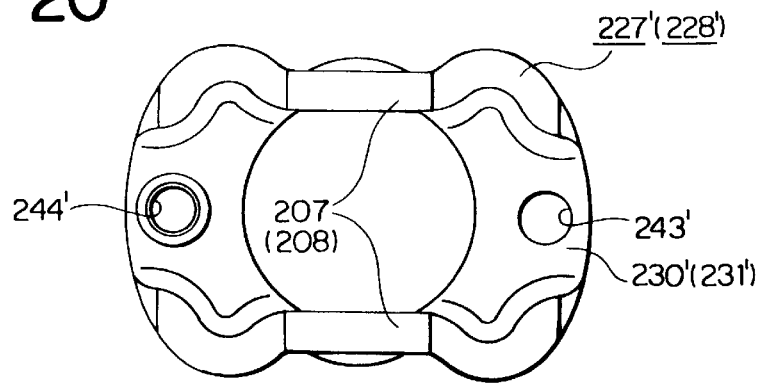
FIG. 20 is a view viewed in the similar manner to the views in FIGS. 16 and 17, for showing the first and second intermediate housing elements to be incorporated in the second example.
Figure 19:
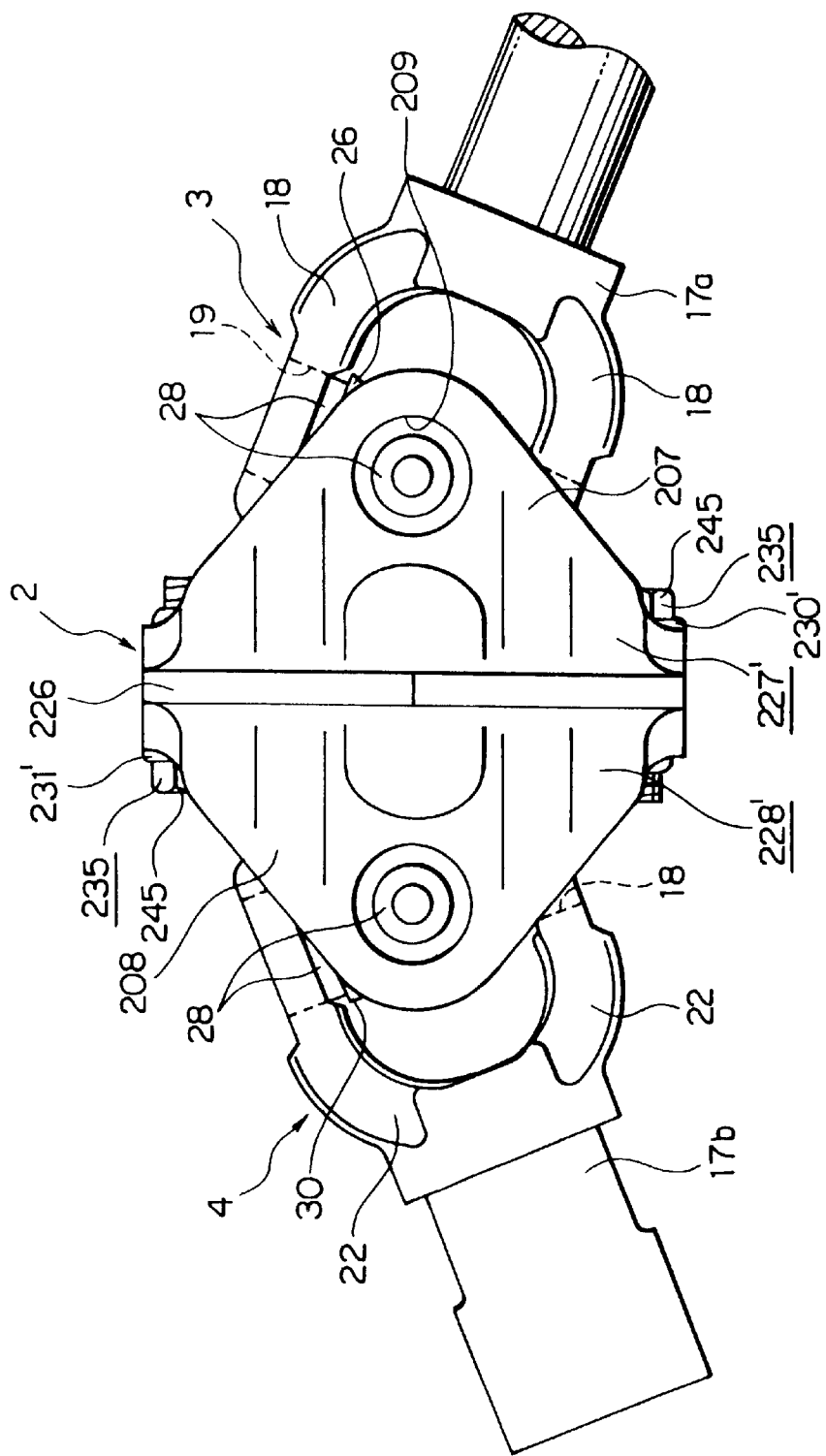
FIG. 19 is a view showing a second example of the seventh embodiment in the same state as in FIG. 15.
Figure 21:
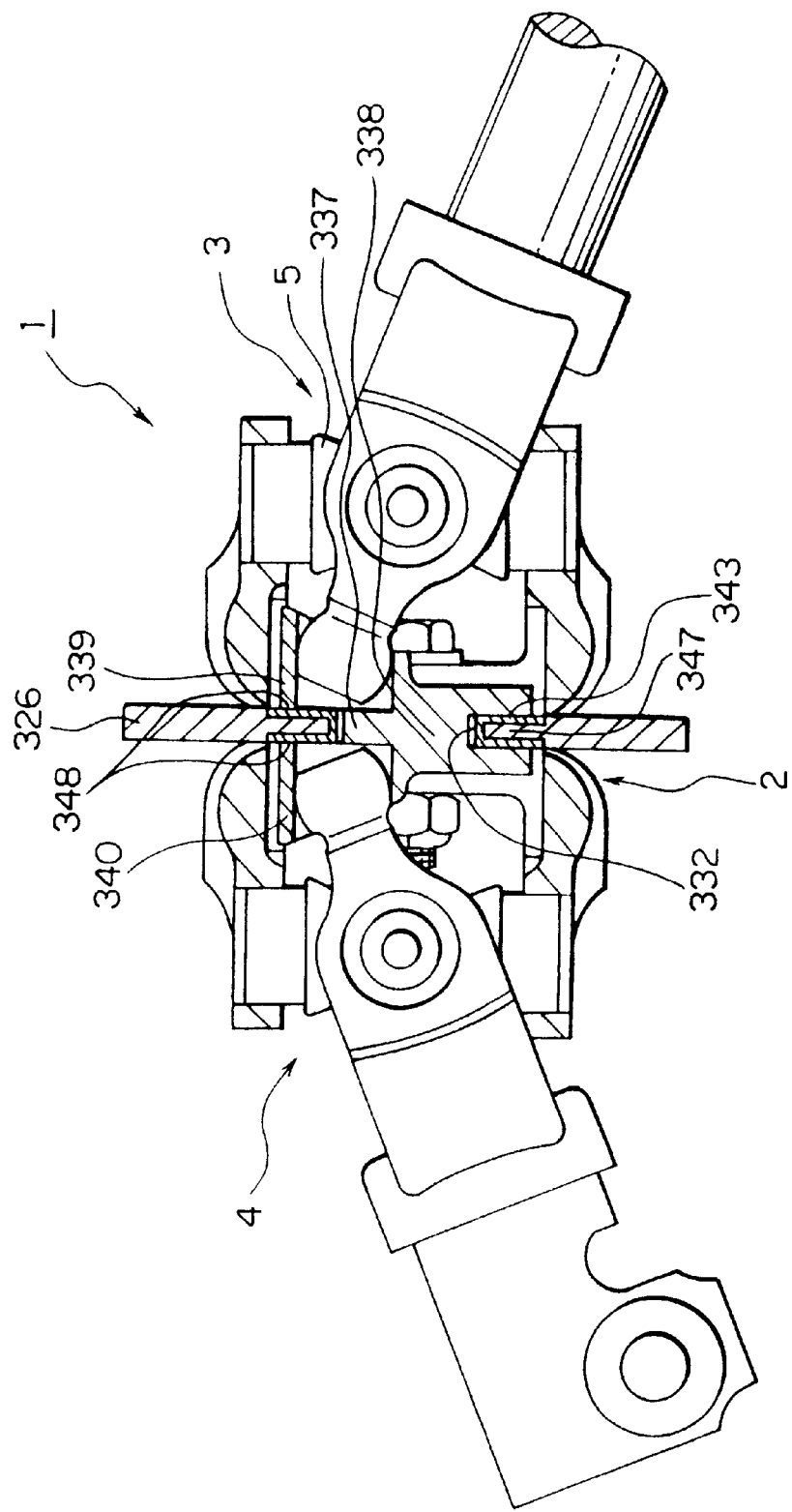
FIG. 21 is a partial cut-away side view showing a first example of an eight embodiment of the present invention.
Figure 22:
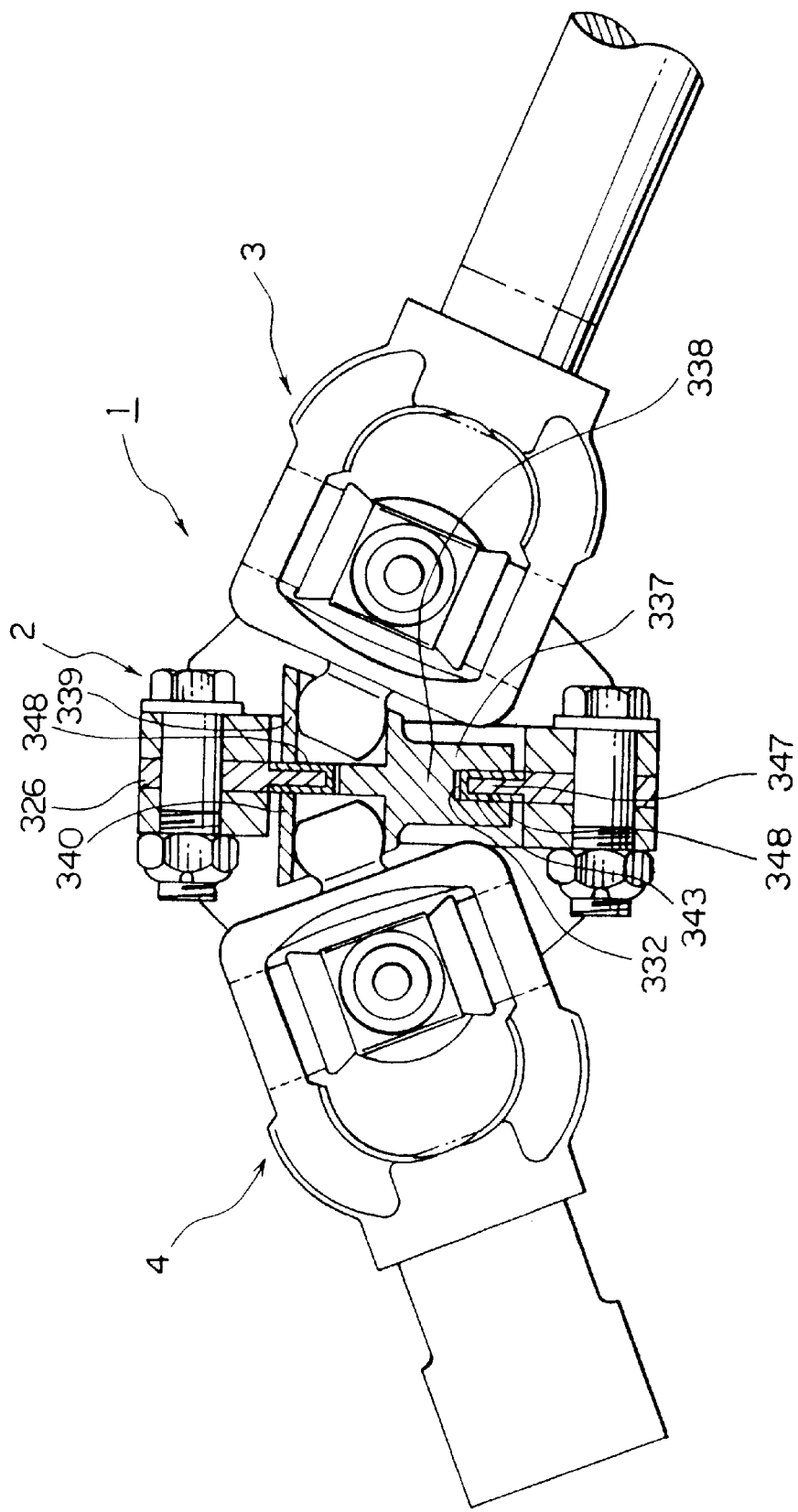
FIG. 22 is a partial cut-away side view showing a state rotated through 90 degrees from the state shown in FIG. 21.

Next, FIGS. 19 and 20 illustrate a second example of the seventh embodiment of the present invention. In the case of the foregoing first example, the circular holes 243', 243' are formed on the both end portions of the first base plate 230' for constituting the first intermediate housing element 227', and the screw holes 244', 244' are formed on the both end portions of the second base plate 231' for constituting the second intermediate housing element 228', respectively. Then, both of the two bolts 235, 235 are inserted from the first base plate 230' toward the second base plate 231'. On the other hand, in the present example, as shown in FIG. 20, the circular hole 243' is formed on one end portion of the first base plate 230' for constitution the first intermediate housing element 227' (the case of the second base plate 231' for constituting the second intermediate housing element 228' is the same), and the screw hole 244' on the other end portion, respectively. Then, out of the two bolts 235, 235 for connecting and fixing the first and second intermediate housing elements 227', 228' to the support plate 226', one of the bolts 235 (the lower one in FIG. 19) is inserted from the first base plate 230' toward the second base plate 231', while the other bolt 235 (the upper one in FIG. 19) is from the second base plate 231' toward the first base plate 230', respectively.

As described above, if the directions in which the two bolts 235, 235 are inserted are made to be different from each other, the components of the same kind can be used both for the first intermediate housing element 227' and the second intermediate housing element 228'. As a result, the cost of the double Cardan type constant velocity joint can be reduced by saving a trouble for assembling the components (enhancing the mass production effect) and by saving a trouble for components control. Other structures and effects are the same as those in the foregoing first example, so that repetitive explanations will be omitted.

FIGS. 21 to 26 illustrate an example of an eight embodiment of the present invention. Note that a characteristic of the eight embodiment lies in a structure of a portion in which a slide bearing 343 is mounted on a support plate 326 in order to prevent the abrasion of a slide contact portion between the angle adjusting member 337 and the support plate 326. Other structures and operations are the same as those according to the foregoing embodiments, so that description thereof will be omitted or simplified. Description will be chiefly made below on the characteristics of the eight embodiment and novel structural parts which were not described in the foregoing embodiments.

Figure 23A:
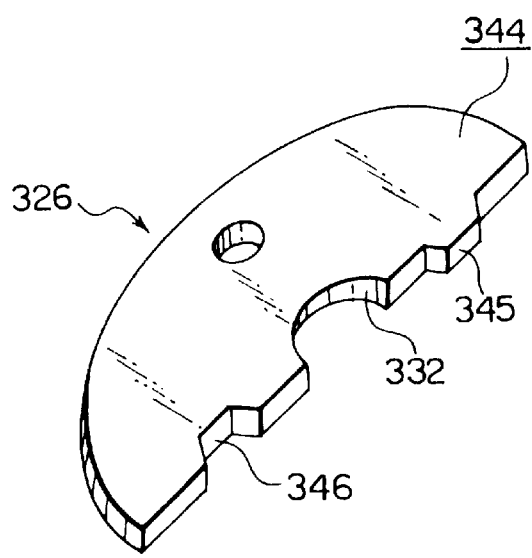
FIG. 23A and FIG. 23B are views showing a half piece for constituting a support plate, FIG. 23A being a perspective view showing a state before formation of a recess for additionally providing a slide bearing, and FIG. 23B showing a state after the formation, respectively.
Figure 23B:
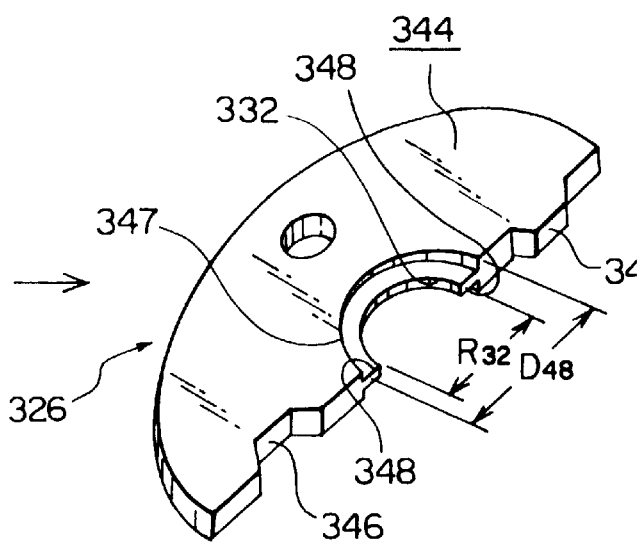
Figure 25:
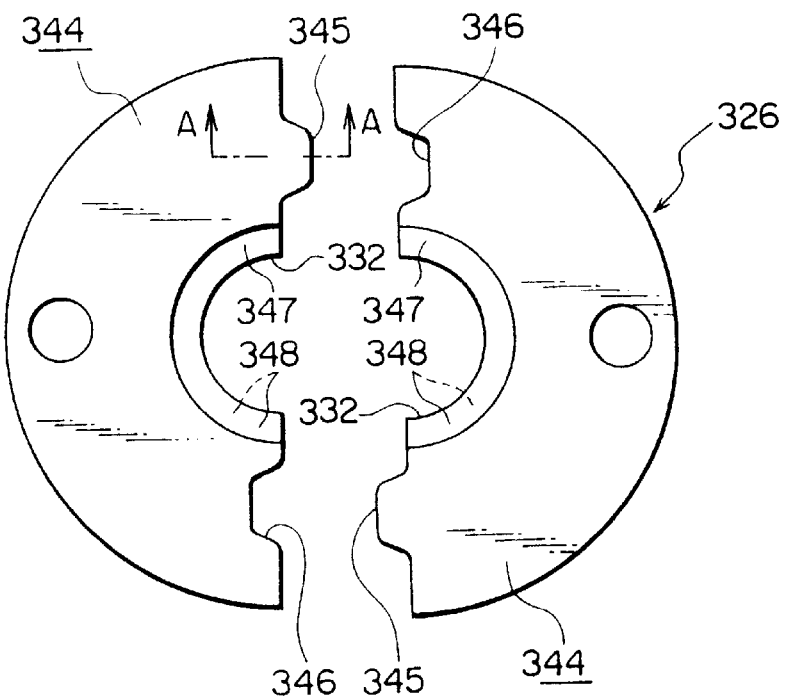
FIG. 25 is a front view showing a pair of half pieces for constituting the support plate.

The support plate 326 is formed in an annular shape as a whole by combing a pair of half pieces 344, 344 respectively having configurations as shown in FIGS. 23B and 25. Each of these half pieces 344, 344 is formed in a semicircular arch, a protrusion 345 is formed on one edge in the circumferential direction of the half piece, and a recess 346 for fitting and fixing this protrusion 345 without any backlash is formed on the other edge in the circumferential direction, respectively. In the illustrated example, the protrusion 345 and the recess 346, each having the form of a trapezoid, are formed in the central portion of the edge in the circumferential direction. As shown in FIG. 25, when the both edges in the circumferential direction of the paired half pieces 344, 344 are placed opposite to each other, and the protrusion 345 and the recess 346 which are formed on the edges in the circumferential direction of the two half pieces 344, 344 are made fitted and fixed to each other, these two half pieces are combined to be concentric to each other to form the annular support plate 326.

A thin portion 347 is formed on the inner peripheral edge portion of each of the half pieces 344, 344 for constituting the support plate 326 in this manner, by plastic working such as coining or cutting working such as milling. This thin portion 347 lies in the central portion relative to the thickness direction of the half pieces 344, 344. Accordingly, annular recesses 348, 348 are provided along the entire circumference of the circular hole 332 in the central portions of the both sides of the support plate 326 which is formed to be annular by combining the paired half pieces 344, 344.

Figure 24:
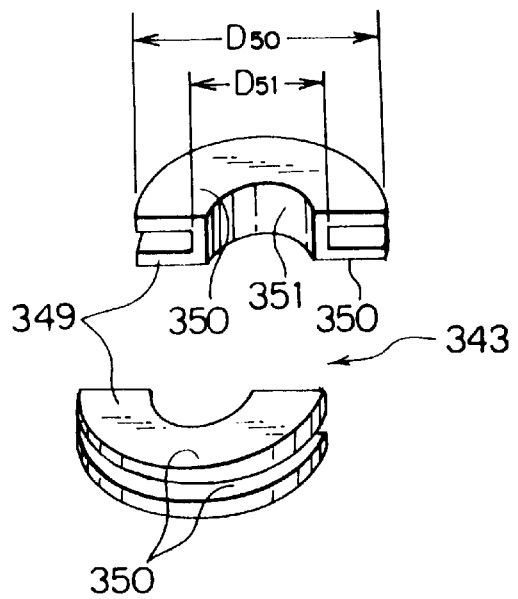
FIG. 24 is an exploded perspective view of a slide bearing.

On the peripheral edge portion of the circular hole 332 which is surrounded by the recesses 348, 348 as stated above, a slide bearing 343 is additionally provided, as shown in FIG. 24. This slide bearing 343 is made in an annular form as a whole by combining a pair of bearing elements 349, 349 which were divided into two in the diametrical direction. The bearing elements 349, 349 are made of a simple substance of polyamide resin or polyacetal resin, or such resin mixed with anti-abrasion agent, friction reducing agent, or the like, or a synthetic resin having excellent anti-abrasion property and lubricating property such as a poly-tetrafluoroethylene resin, or a metallic material having lubricating property such as copper, waxy metal, or the like, into a semicircular arch having a U-shaped section which is opening outwardly in the diametrical direction. Each of these bearing elements 349, 349 is comprised of flat plates 350, 350 each having a semi-annular form, and an arc plate portion 351 for connecting the inner peripheral edges of these flat plates 350, 350 to each other. Out of these components, the outer diameter D50 of the flat plates 350, 350 is made to be equivalent to or a slightly smaller than the outer diameter D48 of the recesses 348, 348 (D50≦D48). The outer diameter D51 of the arc plate portion 351 is made to be equivalent to or a slightly smaller than the inner diameter R32 of the circular hole 332 (D51≦R32).

Figure 26:
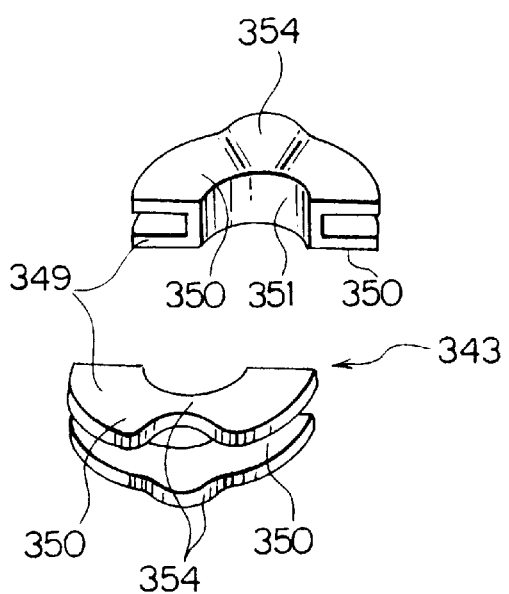
FIG. 26 is a view in the similar manner to the view in FIG. 24, for showing another slide bearing.

Accordingly, the slide bearing 343 which was formed by combining the bearing elements 349, 349 can be mounted without substantial play on the peripheral edge portion of the circular hole 332 which is provided in the central portion of the support plate 326. Also, in the state where the slide bearing 343 is thus mounted in the central portion of the support plate 326, the flat plates 350, 350 are received in the recesses 348, 348 and these flat plates 350, 350 do not protrude from the both sides of the support plate 326 nor are dented on these both sides. However, the outer diameter D50 of the flat plates 350, 350 is larger than the diameter of a swing circle of the angle adjusting member (the diameter of the locus of the front end edge of the first and second crank portion 339, 340 when the angle adjusting member 337 is rotated around the intermediate portion 338), so that there is no need to strictly align the outer side face of the flat plates 350, 350 with the both sides of the support plate 326. For example, it is possible to omit the recesses 348, 348 and to make the outer side faces of the flat plates 350, 350 protrude from the both sides of the support plate 326 by the thickness of the flat plates 350, 350. Note that if swollen waveform portions 354, 354 as shown in FIG. 26 are formed in part of the bearing elements 349, 349 forming the slide bearing 343, these swollen portions 354, 354 are elastically compressed in the state where the flat plates 350, 350 are sandwiched in between the thin portion 347 and the first and second crank portions 339, 340, whereby the play of the bearing elements 349, 349 can be prevented more securely.

In the case of the double Cardan type constant velocity joint according to the eight embodiment of the present invention structured as described above, there is no chance of direct friction between the metal for forming the support plate 326 such as steel and the metal for forming the angle adjusting member 337 such as steel because of the presence of the slide bearing 343 which is comprised of the paired bearing elements 349, 349. As a result, even when a torque to be transmitted is large and the angle adjusting member 337 strongly impinge upon the support plate 326, no conspicuous abrasion is brought about in the slide contact portion between the support plate 326 and the angle adjusting member 337. Note that in order to prevent the slide baring 343 from rotating relative to the support plate 326, an uneven engagement portion for preventing a rotation of the slide bearing 343 is preferably provided between one or both of the paired bearing elements 349, 349 and the support plate 326. A part, for example, in which the outer peripheral surface of the arc plate portion 351 and the inner peripheral edge of the circular hole 332 are aligned with each other can be considered as a portion in which such uneven engagement portion is to be provided.

Figure 27:
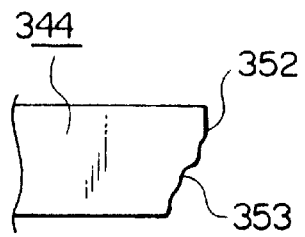
FIG. 27 is an enlarged sectional view taken along the line A—A in FIG. 25.
Figure 28:
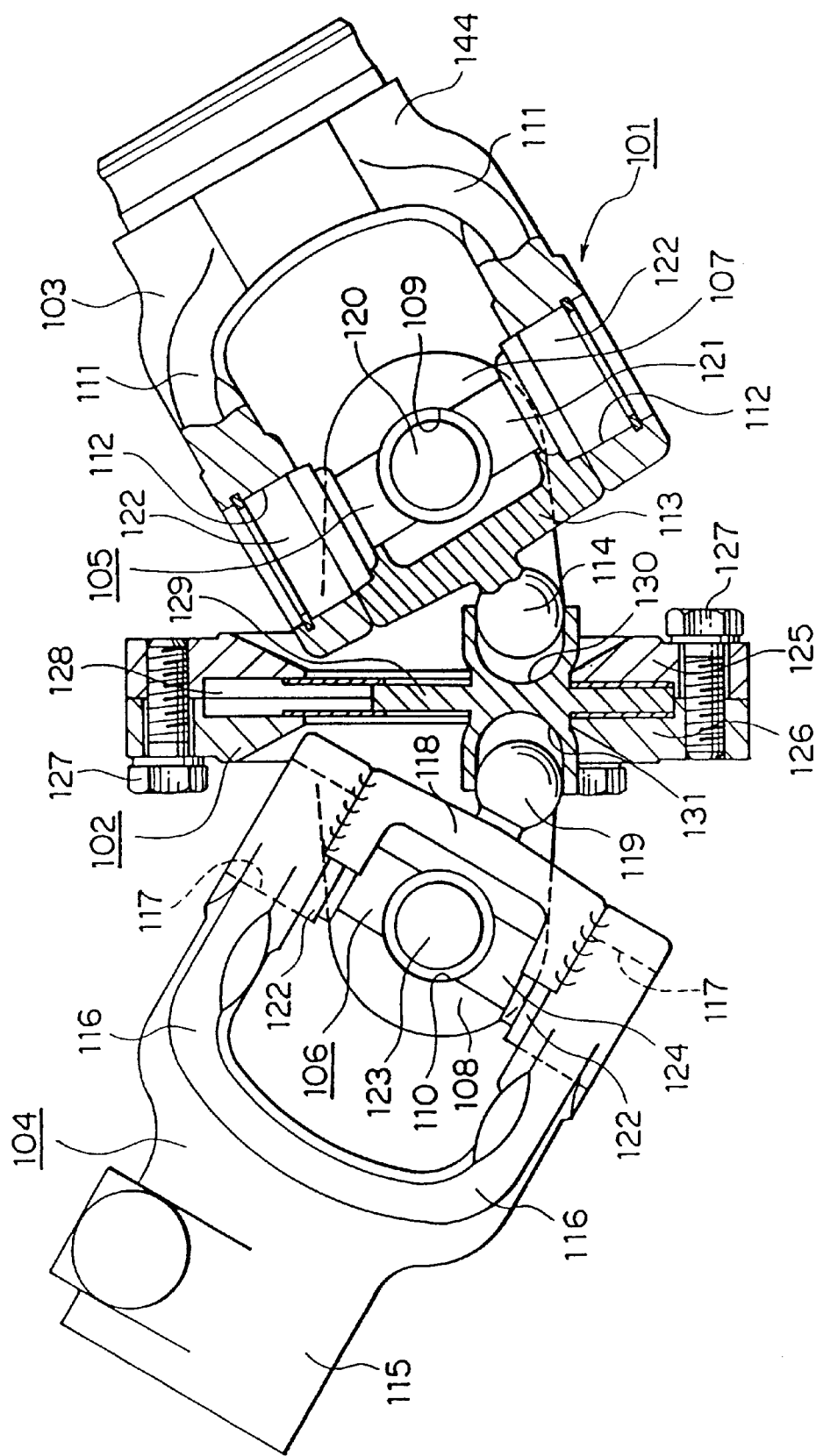
FIG. 28 is a partial sectional view showing one example of a prior art structure.
Figure 29:
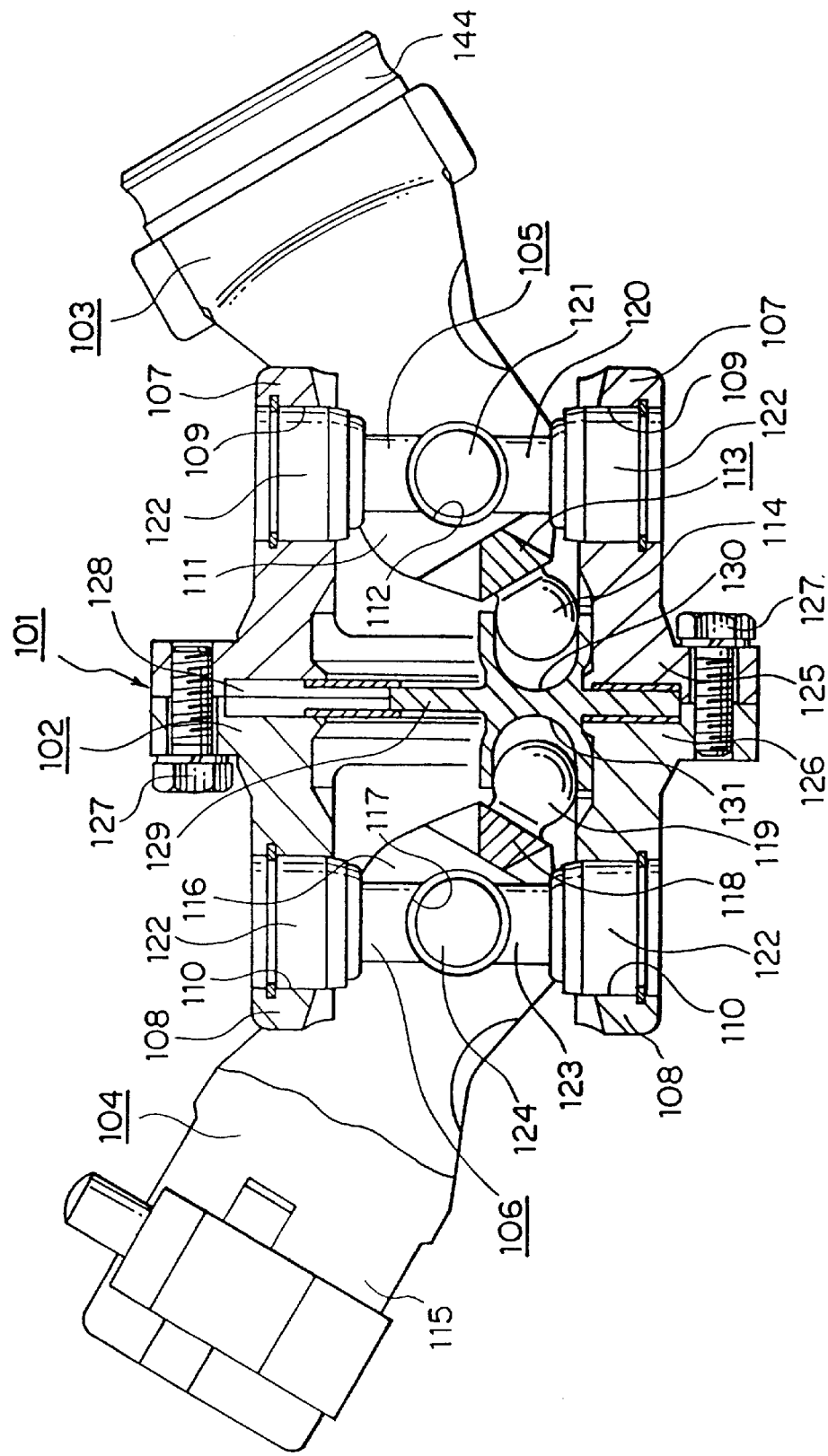
FIG. 29 is a view showing a state of rotation through 90 degree from the state in FIG. 28.

Further, in the illustrated example, when the protrusion 345 and the recess 346 are formed on the both edges in the circumferential direction of the half pieces 344, 344 forming the support plate 326 and the support plate 326 is formed by combining the paired half pieces 344, 344, the protrusion 345 and the recess 346 are engaged with each other. As a result, the assembling performance of the support plate 326 can be enhanced and the assembling accuracy can be maintained. That is, if the half pieces 344, 344 are formed by punching steel plates in order to reduce the costs, a sheared section 352 and a broken section 353 are formed on the periphery of each of these half pieces 344, 344, as shown in FIG. 27. Out of these sections, the sheared section 352 is stable in terms of the dimensional accuracy and the configurational accuracy, while the broken section 353 is of poor accuracy. Accordingly, when the support plate 326 is to be constituted by combining the paired half pieces 344, 344, two of the sheared section 352 are required to abut with each other (and the sheared section 352 and the broken section 353 are made not to abut with each other) in order to obtain the support plate 26 having a desired accuracy.

As shown in the illustrated example, if the both edges in the circumferential direction of the paired half pieces 344, 344 respectively having the configuration as shown in FIGS. 23 and 25 are placed to be opposite to each other and the protrusion 345 and the recess 346 formed on the edges in the circumferential direction of these half pieces 344, 344 are fitted and fixed to each other to constitute the support plate 326 in an annular form, the two sheared sections 352 are made to abut with each other (and the sheared section 353 and the broken section 353 are made not to abut with each other) so as to obtain the support plate 326 having a desired accuracy. This process can be securely conducted simply by fitting and fixing the protrusion 345 to the recess 346, so that the process of combining the paired half pieces 344, 344 can be easily conducted. Moreover, a fitting portion between the protrusion 345 and the recess 346 is useful for preventing the paired half pieces 344, 344 forming the support plate 326 from deviating to the circumferential direction after they are combined to each other so as to secure the rigidity of the support plate 326 and also to maintain the durability of the double Cardan type constant velocity joint which incorporates this support plate 326. On the other hand, when each of the both edges in the circumferential direction of the half pieces 344, 344 is made to be simply linear, either the abutting process of the two sheared sections 352 or the process of combining the paired half pieces 344, 344 concentrically becomes troublesome. Note that when the protrusion 345 and the recess 346 are provided, components of the same kind which can be obtained by press punching of steel plates are used for both of the paired half pieces 344, 344, so that the costs of the support plate 326 can be reduced.

What is claimed is:

1. A double Cardan type constant velocity joint comprising:

an intermediate housing;

first and second yokes, a first cross shaft for connecting said first yoke to said intermediate housing; and a second cross shaft for connecting said second yoke to said intermediate housing, wherein said intermediate housing has a pair of first support arms provided at one end thereof in an axial direction, and a pair of second support arms provided at the other end thereof in the axial direction in equiphase with the pair of first support arms, said intermediate housing including first support holes formed coaxially in end portions of said first support arms and second support holes coaxially formed in end portions of said second support arms, said first yoke has a pair of third support arms provided at an axis-directional end of a first connecting cylindrical portion to which an end portion of a rotary shaft can be connected and fixed, said first yoke including third support holes formed coaxially in close-to-front-end portions of said third support arms, and a first engagement protrusion so formed on an intermediate portion of a first connecting portion for connecting the front ends of said third support arms as to protrude opposite to said first connecting cylindrical portion, said second yoke has a pair of fourth support arms provided at an axis-directional end of a second connecting cylindrical portion to which an end portion of another rotary shaft can be connected and fixed, said second yoke including fourth support holes formed coaxially in close-to-front-end portions of said fourth support arms, and a second engagement protrusion so formed on an intermediate portion of a second connecting portion for connecting the front ends of said fourth support arms as to protrude opposite to said second connecting cylindrical portion, both end portions of a first shaft portion of first and second shaft portions constituting said first cross shaft in a mutually intersecting state, are rotatably supported in said first support holes of said first support arms, both end portions of said second shaft portion are rotatably supported in said third support holes of said third support arms, both end portions of a third shaft portion of third and fourth shaft portions constituting said second cross shaft in a mutually intersecting state, are rotatably supported in said second support holes of said second support arms, both end portions of said fourth shaft portion are rotatably supported in said fourth support holes of said fourth support arms, an axis-directional intermediate portion of said intermediate housing is provided with an angle adjusting member displaceable with respect to said intermediate housing, both end portions, in the axial direction, of said angle adjusting member are formed with first and second engagement holes in equiphase with each other, and angles of inclination of said first and second yokes to said intermediate housing are set coincident with each other by engaging said first engagement protrusion with said first engagement hole and said second engagement protrusion with said second engagement hole in a freely oscillatably displaceable manner, the improvement comprising:

the intermediate housing including a support plate which provides the axis-directional intermediate portion of said intermediate housing;

a circular hole formed in a central portion of said support plate; and the angle adjusting member including a crank type angle adjusting member with a cylindrical intermediate portion rotatably supported in said circular hole of said support plate, and first and second crank portions extending along a same diametrical direction of said cylindrical intermediate portion from both end surfaces, in the axial direction, of said cylindrical intermediate portion, said first engagement hole being formed in a front end portion of said first crank portion, said second engagement hole being formed in a front end portion of said second crank portion.

2. The double Cardan type constant velocity joint according to claim 1, wherein a minor diameter of said circular hole formed in said support plate is set sufficiently larger than a major diameter of said intermediate portion of said angle adjusting member, and said intermediate portion is freely displaceable in radial directions inwardly of said circular hole.

3. The double Cardan type constant velocity joint according to claim 1, wherein the radius of a portion of the cylindrical intermediate portion of said angle adjusting member, which slides on a part of said support plate, is greater than the radius of the circular hole of the support plate.

4. The double Cardan type constant velocity joint according to claim 1, wherein a minor diameter of said circular hole formed in said support plate is set sufficiently larger than a major diameter of said intermediate portion of said angle adjusting member, said intermediate portion is freely displaceable in radial directions inwardly of said circular hole, and the radius of a portion of the cylindrical intermediate portion of said angle adjusting member which slides on a part of said support plate, is greater than the radius of the circular hole of the support plate.

5. The double Cardan type constant velocity joint according to claim 3, wherein both end portions, in the axial direction, of the cylindrical intermediate portion of said angle adjusting member are formed with collar portions between which both surfaces of said support plate are sandwiched, and a major diameter of each of said collar portions is set sufficiently larger than a minor diameter of said circular hole formed in said support plate.

6. The double Cardan type constant velocity joint according to claim 1, wherein a dimension, in the radial direction, of a minor diameter side gap existing between an outer peripheral surface of said intermediate portion of said angle adjusting member and an inner peripheral surface of said circular hole of said support plate, is equalized to a dimension, in the radial direction, of a major diameter side gap existing between an outer peripheral edge of said collar portion and a partial inner peripheral surface of said intermediate housing.

7. The double Cardan type constant velocity joint according to claim 1, wherein said intermediate housing is constructed by connecting a first intermediate housing element including said first support arms and formed by press-working a metal plate, and a second intermediate housing element including said second support arms and formed by likewise press-working a metal plate.

8. The double Cardan type constant velocity joint according to claim 7, wherein the cross-sectional configuration of the portions of said first and second support arms opposite to said support plate is waveformed.

9. The double Cardan type constant velocity joint according to claim 1, wherein said intermediate housing further includes a first intermediate housing element press-formed of a metal plate and provided with said first support arms, and a second intermediate housing element press-formed of a metal plate and provided with said second support arms, and a bolt which connects and fixes said first and second intermediate housing elements with sandwiching said support plate therebetween, and at least one of said first and second intermediate housing elements is formed with a screw hole for thread engagement with a tip end of said bolt.

10. The double Cardan type constant velocity joint according to claim 1, wherein a slide bearing made of a low frictional material is provided on a portion which is partly contacted in a sliding manner to said angle adjusting member on both sides of the central portions of said support plate and on the inner peripheral edge of said circular hole, thereby preventing the direct contact between the metal for forming the support plate and the metal for forming the angle adjusting member.

11. The double Cardan type constant velocity joint according to claim 1, wherein said support plate is composed of two half pieces divided in a cross-section passing through a center of a circular hole, each of the half pieces being formed with a projection and a recess at the cross-section.

* * * * *